US007143367B2

(12) United States Patent
Eng

(10) Patent No.: US 7,143,367 B2
(45) Date of Patent: Nov. 28, 2006

(54) CREATING OPTIMIZED PHYSICAL IMPLEMENTATIONS FROM HIGH-LEVEL DESCRIPTIONS OF ELECTRONIC DESIGN USING PLACEMENT-BASED INFORMATION

(75) Inventor: Tommy K Eng, San Jose, CA (US)

(73) Assignee: Tera Systems, Inc., San Jose, CA (US)

( * ) Notice: Subject to any disclaimer, the term of this patent is extended or adjusted under 35 U.S.C. 154(b) by 142 days.

(21) Appl. No.: 10/040,852

(22) Filed: Dec. 28, 2001

(65) Prior Publication Data

US 2002/0059553 A1    May 16, 2002

Related U.S. Application Data

(63) Continuation of application No. 09/634,927, filed on Aug. 8, 2000, now Pat. No. 6,360,356, which is a continuation of application No. 09/015,602, filed on Jan. 30, 1998, now Pat. No. 6,145,117.

(51) Int. Cl.
*G06F 17/50* (2006.01)
(52) U.S. Cl. .............................. 716/2; 9/11; 9/12; 9/18
(58) Field of Classification Search .................... 716/1, 716/2, 4, 5, 6, 9, 12, 18, 11
See application file for complete search history.

(56) References Cited

U.S. PATENT DOCUMENTS

| 5,222,030 A | 6/1993 | Dangelo et al. ............ 364/489 |
| 5,493,508 A | 2/1996 | Dangelo et al. ............ 364/489 |
| 5,526,277 A | 6/1996 | Dangelo et al. ............ 364/489 |
| 5,530,841 A | 6/1996 | Gregory et al. ............ 395/500 |
| 5,537,580 A | 7/1996 | Giomi et al. ............... 395/500 |
| 5,541,849 A | 7/1996 | Rostoker et al. ............ 364/489 |

(Continued)

FOREIGN PATENT DOCUMENTS

EP    0 539 641    5/1993

(Continued)

OTHER PUBLICATIONS

Alpert, C. J. et al., "Quadratic Placement Revisited," Association for Computing Machinery, Inc., Design Automation Conference, pp. 752-757, Jun. 1997.

(Continued)

*Primary Examiner*—Thuan Do
(74) *Attorney, Agent, or Firm*—Sterne, Kessler, Goldstein & Fox, P.L.L.C.

(57) ABSTRACT

An electronic design automation system provides optimization of RTL models of electronic designs, to produce detailed constraints and data precisely defining the requirements for the back-end flows leading to design fabrication. The system takes a RTL model of an electronic design and maps it into an efficient, high level hierarchical representation of the hardware implementation of the design. Automatic partitioning partitions the hardware representation into functional partitions, and creates a fully characterized performance envelope for a range of feasible implementations for each of the partitions, using accurate placement based wire load models. Chip-level optimization selects and refines physical implementations of the partitions to produce compacted, globally routed floorplans. Chip-level optimization iteratively invokes re-partitioning passes to refine the partitions and to recompute the feasible implementations. In this fashion, a multiple-pass process converges on an optimal selection of physical implementations for all partitions for the entire chip that meet minimum timing requirements and other design goals. The system outputs specific control and data files which thoroughly define the implementation details of the design through the entire back-end flow process, thereby guaranteeing that the fabricated design meets all design goals without costly and time consuming design iterations.

35 Claims, 14 Drawing Sheets

U.S. PATENT DOCUMENTS

Figure 1:
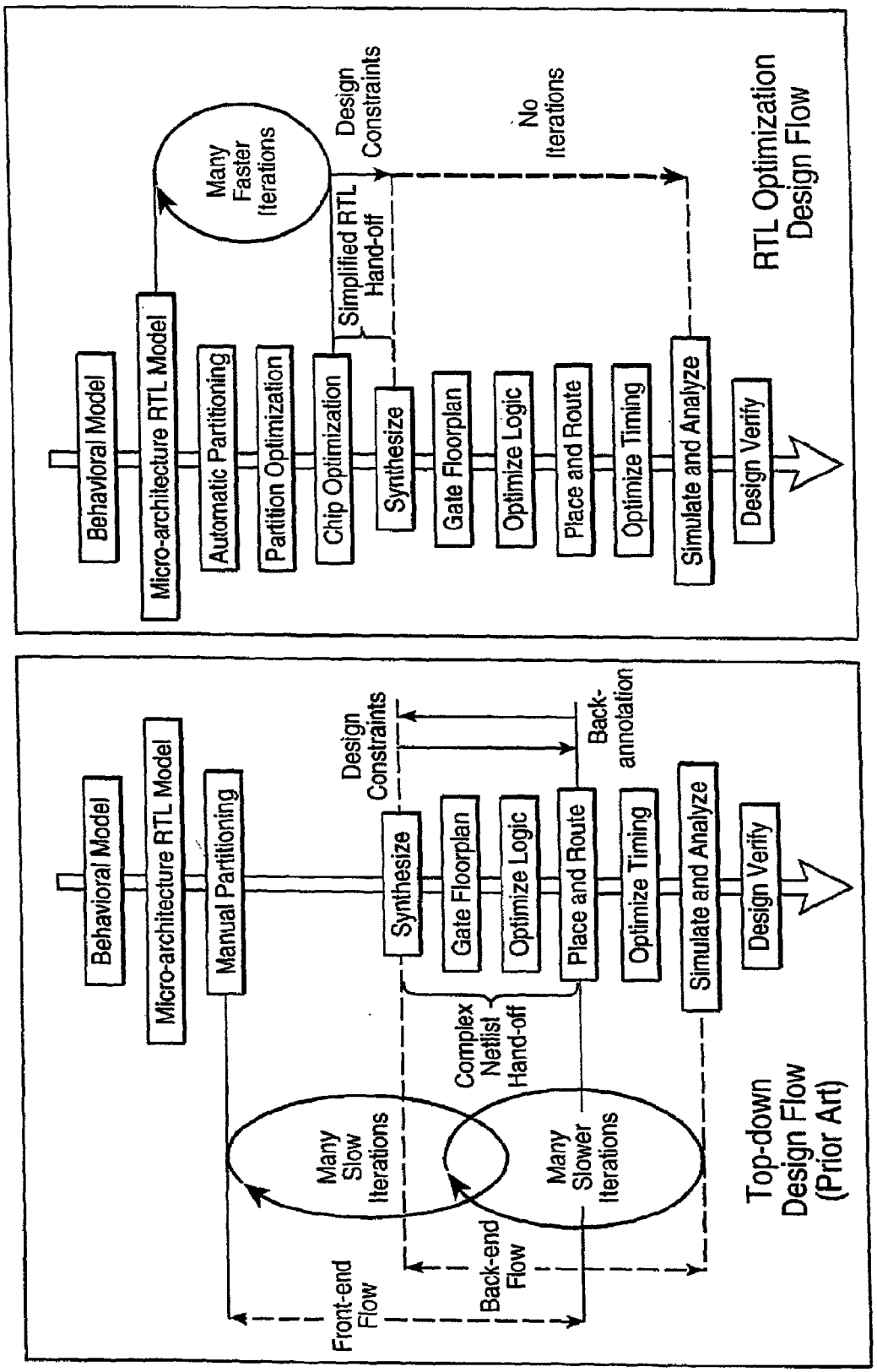

| | | | |
|---|---|---|---|
| 5,544,066 | A | 8/1996 | Rostoker et al. ............ 364/489 |
| 5,544,067 | A | 8/1996 | Rostoker et al. ............ 364/489 |
| 5,553,002 | A | 9/1996 | Dangelo et al. ............ 364/489 |
| 5,555,201 | A | 9/1996 | Dangelo et al. ............ 364/489 |
| 5,557,531 | A | 9/1996 | Rostoker et al. ............ 364/489 |
| 5,572,436 | A | 11/1996 | Dangelo et al. ............ 364/489 |
| 5,572,437 | A | 11/1996 | Rostoker et al. ............ 364/489 |
| 5,870,308 | A | 2/1999 | Dangelo ............... 395/500.02 |
| 6,216,252 | B1 * | 4/2001 | Dangelo et al. ............... 716/1 |
| 6,324,678 | B1 * | 11/2001 | Dangelo et al. ............... 716/18 |
| 6,360,356 | B1 | 3/2002 | Eng |

FOREIGN PATENT DOCUMENTS

| | | |
|---|---|---|
| WO | WO 96/02038 | 1/1996 |

OTHER PUBLICATIONS

Dutt, N.D. et al., "RT Component Sets for High-Level Design Applications," *VLSI Design*, Gordon & Breach, Switzerland, vol. 5, No. 2, pp. 155-165, 1997.

Kumar, T. et al., "Hierarchical Behavioral Partitioning for Multicomponent Synthesis," Proceedings Euro-Dac '96, European Design Automation Conference with Euro-VHDL '96 and Exhibition (CAT No. 96CB36000), pp. 212-217, Los Alamitos, CA., Sep. 1996.

Nair, R. et al., "Generation of Performance Constraints for Layout," *IEEE Transactions on Computer-Aided Design*, vol. 8, No. 8, pp. 860-874, Aug. 1989.

Shahid, Kham, "RTL Foorplanning Speeds Deep-Submicron Design," *Computer Design*, vol. 35, No. 2, pp. 103-106, Feb. 1996.

Tuck, B., "RTL floorplanner predicts timing, power for deep-submicron ICs", *Computer Design* International Edition, Pennwell Publishing, USA, vol. 35, No. 4, pp. 56-59, Mar. 1996.

Venkatesh, S. V., "Hierarchical Timing-Driven Floorplanning and Place and Route Using a Timing Budgeter," IEEE Custom Integrated Circuits Conference, pp. 469-472, 1995.

International Search Report, PCT/US99/01965, 4 pages, Aug. 4, 1999.

Alcatel Telecommunications Review, 2nd Quarter, 1996, *The Challenge of Designing Million-Transistor ASICs*, H. Casier et al., pp. 122-129.

31st Design Automation Conference®, San Diego, CA, Jun. 6-10, 1994, *Technology Mapping Using Fuzzy Logic*, Sasan Iman et al., pp. 333-338.

*Layout Driven Technology Mapping*, Massoud Pedram et al., 28th ACM/IEEE Design Automation Conference, pp. 99-105.

Hewlett-Packard Journal, Feb. 1995, vol. 46, No. 1, *Shortening the Time to Volume Production of High-Performance Standard Cell ASICs*, Jay D. McDougal et al., pp. 91-96.

*Layout-DrivenRTL Binding Techniques for High-Level Syntrhesis*, Min Xu et al., 1996 IEEE, pp. 33-38.

Proceedings of the IEEE 1989 Custom Integrated Circuits Conference, May 15-18, 1989, *LOGOPT-A Multi-Level Logic Synthesis and Optimization System*, Ajit M. Prabhu, pp. 4.1.1-4.1.4.

McFarland, M.C., et al., "Tutorial on High-Level Synthesis", Proceedings of the 25th ACM/IEEE Design Automation Conference, Anaheim, CA, Jun. 12-15, 1988; IEEE, Piscataway, NJ, USA; pp. 330-336.

Dutta, R., et al., "Distributed Design-Space Exploration for High-Level Synthesis Systems", Proceedings of the 29th ACM/IEEE Design Automation Conference, Anaheim, CA, Jun. 8-12, 1992; IEEE Comp. Soc. Press, US, Conf. 29, pp. 644-650.

European Search Report for corresponding European application No. 99 903 493.7-2201, dated Oct. 17, 2005.

* cited by examiner

| Category | LBB |
|---|---|
| Adder | Adder, AdderCi, AdderCiCo, AdderCo |
| Arithmetic | ALU, Modulus, Multiplier, Divider, UnaryMinus |
| Buffers | Buffer, TriStateBuf |
| Comparator | Equal, Greater, GreaterOrEqual, Less, LessOrEqual, NotEqual |
| Complex Logic | Finite State Machine, Hard Macros |
| Decoder | BinaryDecoder |
| Decrementer | Decrementer, DecrementerCi, DecrementerCiCo, DecrementerCo |
| Encoder | BinaryEncoder, PriorityEncoder |
| Incrementer | Incrementer, IncrementerCi, IncrementerCiCo, IncrementerCo |
| Logic Gates | And, Nand, Nor, Or, Xnor, Xor, Inverter, And-Or (AO), And-Or-Invert (AOI) |
| Memory | RAM, ROM, Register File |
| Mux | Mux, PriorityMux, UnencodedMux (AOI), InvMux, InvPriorityMux, InvUnencodedMux |
| Reduce Gates | ReduceAnd, ReduceNand, ReduceNor, ReduceOr, ReduceXnor, ReduceXor |
| Shift | ArithmeticShift, CircularLeftShift, CircularRightShift, ShiftLeft, ShiftRight |
| Storage | Latch, FlipFlop |
| Subtractor | Subtractor, SubtractorCi, SubtractorCiCo, SubtractorCo |

FIG. 6

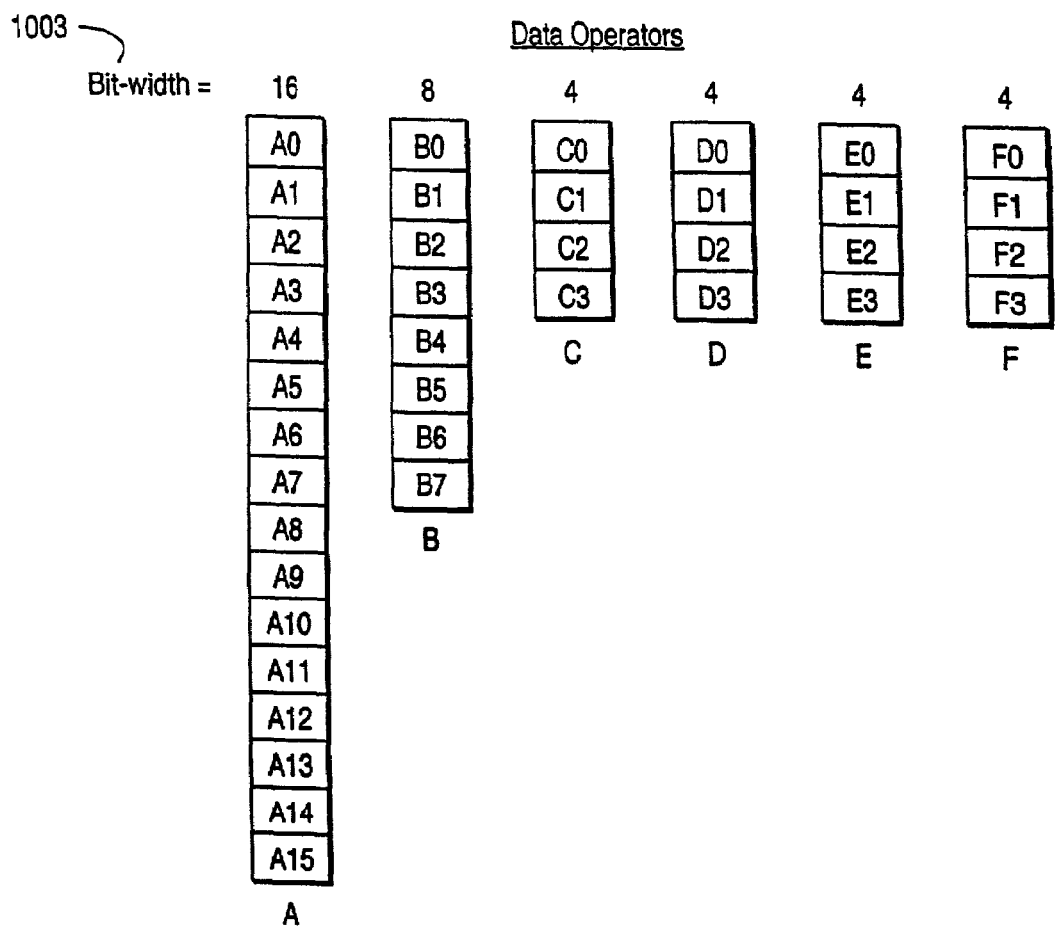
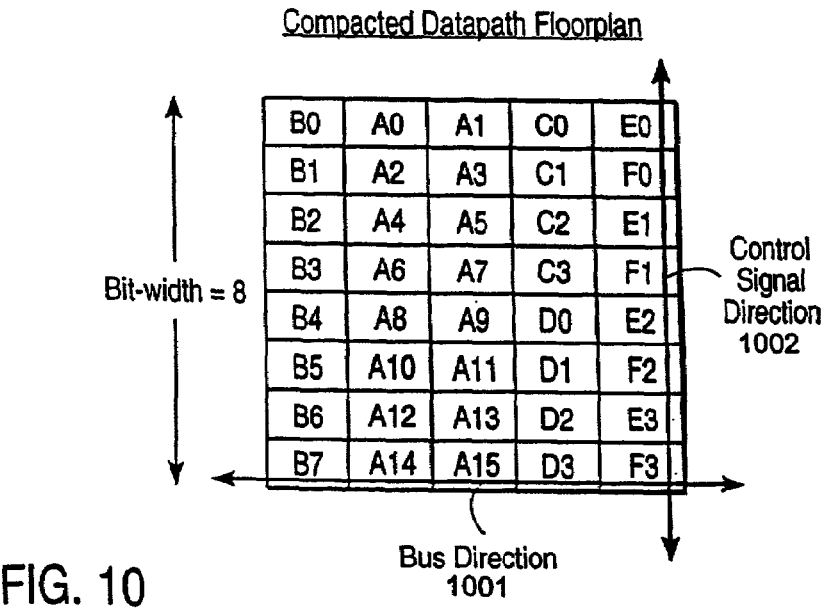
FIG. 10

CREATING OPTIMIZED PHYSICAL IMPLEMENTATIONS FROM HIGH-LEVEL DESCRIPTIONS OF ELECTRONIC DESIGN USING PLACEMENT-BASED INFORMATION

CROSS REFERENCE TO RELATED APPLICATIONS

This application is a continuation of U.S. patent application Ser. No. 09/634,927, filed Aug. 8, 2000 U.S. Pat. No. 6,360,356, which is a continuation of U.S. patent application Ser. No. 09/015,602, filed Jan. 30, 1998, now U.S. Pat. No. 6,145,117.

BACKGROUND OF THE INVENTION

1. Field of the Invention

The present invention relates generally to methods and systems used to create efficient physical implementations from high level descriptions of electronic designs and, in particular, to a software system and method that optimizes Register-Transfer-Level (RTL) descriptions with respect to performance parameters including area, timing, and power, prior to logic synthesis, floorplanning, placement and routing.

2. Description of the Background Art

Present Electronic Design Automation (EDA) systems for designing electronic systems consist of software tools running on a digital computer that assist a designer in the creation and verification of complex electronic designs. Present day state-of-the-art design technique uses a combination of logic synthesis, floorplanning, place-and-route, parasitic extraction, and timing tools in an iterative sequence to form a design process commonly known as the top-down design methodology.

The left side of FIG. 1 illustrates a typical top-down design process. The primary entry point into the top-down design flow is a high level functional description, at behavioral-level or RTL, of an integrated circuit design expressed in a Hardware Description Language (HDL). This design is coupled with various design goals, such as the overall operating frequency of the Integrated Circuit (IC), circuit area, power consumption, and the like.

Conventional top-down methodology uses two overlapping processes, a front-end flow, and a back-end flow. Each of these flows involve multiple time consuming iterations, and the exchange of very complex information. In the front-end of the top-down methodology, the RTL model is manually partitioned by the designer into various functional blocks the designer thinks best represents the functional and architectural aspects of the design. Then, logic synthesis tools convert the functional description into a detailed gate-level network (netlist) and create timing constraints based on a statistical wire-load estimation model and a pre-characterized cell library for the process technology that will be used to physically implement the integrated circuit.

The gate-level netlist and timing constraints are then provided to the back-end flow to create a floorplan, and then to optimize the logic. The circuit is then placed and routed by the place-and-route tool to create a physical layout. After place-and-route, parasitic extraction and timing tools (typically by the circuit fabricator) feed timing data back to the logic synthesis process so that a designer can iterate on the design until the design goals are met.

While the synthesis and place-and-route automation represent a significant productivity improvement over an otherwise tedious and error-prone manual design process, the top-down design methodology has failed to produce efficient physical implementations of many circuit designs that take full advantage of the capability of advanced IC manufacturing processes. This is evident in the growing "design gap" between what semiconductor vendors can manufacture with today's deep sub-micron processes and what IC designers can create using top-down EDA design tools. The latest 0.18 μm CMOS process can fabricate silicon die with 10 million gates, running at speeds in excess of 500 MHz. In contrast, designers using conventional top-down EDA tools struggle with the creation, analysis, and verification of integrated circuits having 0.5–1 million gates, running at 150 MHz.

The primary inefficiency of the top-down methodology arises from its reliance on statistical wire-load models proved to be inadequate in wire-delay dominated deep sub-micron digital systems. Timing in deep sub-micron integrated circuits is dominated by interconnect delays rather than gate delays. Conventional top-down design tools, such as behavioral and logic synthesis, were originally designed in an era when gate delays dominated chip timing. These tools use inaccurate, statistical wire-load estimates to model wiring parasitics at early stages in the design cycle, and the effects of these inaccuracies are propagated throughout the rest of the design methodology. To overcome the timing model inaccuracies, the designer engages in excessive and time-consuming iterations of logic synthesis, floorplanning, logic optimization, and place-and-route in attempting to converge on the timing constraints for the circuit. This iterative loop is referred to as the timing-convergence problem.

The large discrepancy between statistical wire-load model and actual wire-load means that circuit designers must wait until gate-level floorplanning and place and route tasks are complete to begin chip-level optimization. The enormous gate-level complexity of today's system-on-a-chip designs places a heavy burden on gate-level verification and analysis tools and makes multiple design iterations very time consuming.

Additionally, the complexity of present high performance integrated circuit designs overwhelms the capability of logic synthesis tools. Synthesis execution times of many hours on present day high-performance engineering workstations are typical for circuits containing only tens-of-thousands of logic gates. Place-and-route execution times for these circuits can also consume many hours. It is not unusual for a single synthesis and place-and-route iteration for a circuit containing tens-of-thousands of logic gates to take days. Synthesis and place-and-route tool run times grow non-linearly, sometimes exponentially, as the size of the circuit grows and as circuit-performance goals are increased. Thus, logic synthesis cannot process complex designs all at once. Designers are forced to develop functional descriptions and manually partition the design into smaller modules, upon which logic synthesis is individually performed. During manual partitioning, however, the designer has little or no accurate information on the back-end physical effect of the partitioning, and in particular, on the effect of such partitions on timing, area, and power consumption. The relationship between high-level functional description and the low-level layout physical effect is not obvious at the front-end design stage. The failure to predict accurate back-end physical effect at or above the RTL design stage results in local optimization and a sub-optimal functional description of the design. Design efficiency suffers due to design over-constraint (timing non-convergence) or under-constraint (loss of performance and density), or some combination of both for various different partitions of the integrated circuit. Suboptimal RTL descriptions and partitioning serve as a poor starting point for logic synthesis, which propagates and amplifies the design deficiencies, eventually leading to silicon inefficiency (e.g., excessive area or power consumption, slower operating frequency), even after long iteration and manual intervention.

Further inefficiency in the top-down design methodology is introduced because logic synthesis tools treat all logic as random logic. Consequently, logic synthesis typically fails to recognize and take advantage of more efficient silicon structures such as datapaths, which are commonly used and expressed in the high level description of the design. Designers who recognize this limitation frequently bypass synthesis by manually instantiating gate-level elements in their RTL source. This is equivalent to writing a gate-level netlist, an onerous, low-productivity, and error-prone task.

Another deficiency of the top-down methodology is that it requires a cumbersome netlist hand-off between front-end and back-end design cycles. Complex bi-directional information transfer occurs at the overlap between front-end and back-end iteration loops. The diverse design expertise required to effectively manage the top-down design process is rare and not commonly available to a typical design team. Design inefficiency causes the costly under-utilization of advanced IC manufacturing processes. The iterative nature of the top-down design methodology requires long design time and large design teams, often not available or even feasible in a competitive design environment characterized by short product life-cycles and short time-to-market requirements. Thus, achieving rapid timing convergence while satisfying density, power, and productivity constraints for high performance complex systems is a daunting challenge facing the electronic design industry today.

Accordingly, there is a need for an EDA system that improves the present top-down methodology in performance, density, power, and design productivity. In particular, there is a need for a software method and system that optimizes the design of an integrated circuit at the RTL stage, prior to conventional logic synthesis, floorplanning, and place-and-route design stages.

SUMMARY OF THE INVENTION

The present invention overcomes the limitations of the conventional top-down methodology with an RTL optimization system and method that enhances existing top-down EDA systems by implementing an automatic performance-driven design paradigm. The RTL optimization system of the present invention implements automatic hierarchical structured custom design and delivers significant improvements in performance, density, power, and productivity over the existing top-down design methodology. The RTL design methodology of the present invention enables the user to enter, analyze, debug, optimize, and implement their designs by working exclusively with RTL models before logic synthesis. Full-chip design, analysis, and optimization run orders-of-magnitude faster than conventional gate-level tools, thereby enabling truly interactive design.

The RTL design methodology and system of the present invention uses placement based wire load models to capture the performance characteristics of the known physical implementations of individual partitions of an electronic design, and of the overall electronic design itself, prior to any logic synthesis. This performance data is used to optimize the partitioning, floorplanning, and routing of the electronic design in order to find a known solution to design goals. This solution defines the physical implementation of the electronic design at the partition and chip level and thus constrains the back-end flow so that only a single pass through conventional logic synthesis, place-and-route, and so forth is required.

In a preferred embodiment, the hand-off between the RTL optimization system and the conventional back-end flow includes the RTL model along with chip and block level netlists, floorplans, routing, aspect ratios and areas, pin assignments, output loads, input, output and internal timing constraints, placement based wire loads for wires within and between partitions, and command scripts for controlling back-end tools. In this fashion, the back-end flow can be fully constrained to a single pass, thereby accomplishing true RTL level hand-off.

More particularly, placement based wire load models are used throughout the RTL optimization process to characterize the performance of logic structures, partitions, and the overall chip or electronic design. This performance characterization of the timing, area, power, and other performance attributes is used to optimize the electronic design at the RTL level. This feature eliminates the conventional requirement of logic synthesis, floorplanning, and routing normally needed to capture the performance characteristics of the physical implementation. Another feature of the present invention is the ability to fully characterize the performance of a logic structure using performance data of a number of physical implementations of the logic structure derived from a placement based wire load model.

Yet another feature of the present invention is the generation of such performance data for a variety of a physical implementations to create a fully characterized library, here called a library of logic building blocks or "LBBs". A LBB is a high level, technology-independent description of a logic structure that has performance data fully characterizing its performance envelope over a range of different physical implementations. The performance data preferably quantifies the relationship between the area, circuit delay, and output load of the logic structure for a number of different physical implementations. This performance data is created by placing and routing each physical implementation to create a placement based wire load model. The performance data may be characterized further for both random logic and datapath implementations. In addition, the performance data preferably defines these area, timing and output load relationships for each of a number of bit widths, and a number of driver sizes for various typical loading conditions. A LBB may have multiple implementations representing different area and speed tradeoffs. The performance data of a LBB for these different physical implementations thus defines its entire performance envelope. LBBs range from simple gates (inverter, NAND, latch, flip-flop) to complex logic structures such as adder, finite state machine, memory, and encoder. The use of LBBs elevates the pre-characterized library approach from the conventional gate level to a complex-structure module level, and allows the accurate performance data which characterizes the LBB to be used at the RTL design level to optimize the partitioning and floorplanning of the electronic design.

Another feature of the present invention is the fully automatic partitioning of the RTL model and subsequent automatic refinement of the partitions during chip optimization. Automatic partitioning creates partitions that optimize the local and global floorplanning, routing, timing and so forth, using the placement based wire load information. A high level chip optimization process can induce repartitioning to move logic between partitions, combine or split partitions as needed to meet design goals and generate timing and other constraints. This automatic process removes the burden from the designer of having to manually partition the design and allocate timing between partitions, only to find from the subsequent back-end flow that such timing allocations and partitions are either infeasible or suboptimal.

The right side of FIG. 1 illustrates the overall design flow in accordance with the present invention. Beginning with an RTL model of an electronic design, the present invention first automatically partitions the RTL model into a number of physical partitions. This automatic partitioning transforms the logical hierarchy of functionality inherent in the RTL model into a physical hierarchy optimized for the chip-level physical implementation. The partitions are optimized to select local physical implementations given the current design goals. Chip optimization, including floorplanning, pin assignment, placement and routing, refines the partitioning, and enables simulation and analysis of timing for the entire chip, and generates additional design constraints. These constraints are fed back through the partitioning and optimization phases to finally converge on an overall timing and area solution. Because this entire process takes place without relying on the gate-level logic design of the conventional top-down approach, many fast iterations through this process enables a large range of different physical implementations to be quickly explored to automatically converge on the optimal physical implementations which satisfies the design goals, typically without the need for intervention or assistance by the designer. A simplified RTL level hand-off along with the generated design constraints is passed to the back-end flow, which now goes through only a single pass to fabricate the circuit design.

In a preferred embodiment, the design methodology and system of the present invention takes an RTL model source and converts it to a network of LBBs that efficiently represent a desired hardware implementation.

The LBB network, and hence the RTL model, is then automatically partitioned into a number of physical partitions, such as datapath, finite state machines, memories, hard macro blocks, and random logic partitions. This functional partitioning transforms the logical hierarchy of functionality inherent in the RTL model into a physical hierarchy optimized for the chip-level physical implementation. The physical hierarchy defines both the connectivity and hierarchical relationships of the partitions.

For each of the physical partitions, a number of feasible block-level physical implementations are modeled automatically. A physical implementation is feasible for a partition if it meets timing and other design constraints defined for the partition, including at least a minimum operating frequency for the entire chip. The implementation model data is extracted from the performance data included in the LBBs of the physical partitions and the placement-based wire-load model of the partition. The range of feasible implementations for a partition will likely vary in area, aspect ratio, timing, and power consumption. Each implementation model includes a pin-to-pin timing model, a placement based wire load model for the partition, and a block-level floorplan with pin assignment.

The next automatic process is a chip-level optimization which produces a first-pass floorplan of the integrated circuit and a set of chip-level design constraints for block-level partitioning refinement. The chip-level optimization uses the feasible block-level implementation models for all partitions, design constraints on chip area, aspect ratio, operating frequency and I/O signal timing, and a chip-level netlist for partition connectivity. Chip-level optimization iterates through the implementation models and performs floorplan creation and compaction, pin assignment, global routing, and global timing analysis.

After the first pass floorplan is generated, the partitions of the floorplan are further optimized based on the refined design constraints derived from chip-level optimization using structural partitioning. Structural partitioning may include moving LBBs between partitions to improve timing, or merging partitions into larger units, breaking partitions up into smaller units, or changing a partition's architecture type (e.g., from a datapath to a random logic partition) to improve packing density. Structural partitioning produces new block-level constraints for datapath and non-datapath partitions which improve timing and floorplan packing density.

New partition implementation models based on refined constraints, along with the other data of the chip design are reintroduced to the chip optimization process for a second and final optimization pass. This second-pass includes a final selection of a physical implementation of all partitions, floorplanning, pin assignment, and global routing.

To interface with conventional back-end process tools, the present invention provides detailed implementation constraints, including an optimal floorplan and placement-based wired load models at chip and block-level. These implementation constraints preferably include partitioning constraints, including a structural RTL netlist for each physical block and top level connectivity; physical constraints, including area, aspect ratio, pin assignment, global wire routing path, and floorplan (chip and block-level); and timing constraints, including output load, input arrival time, output timing constraints, operating frequency, and placement-based wire load models; and command scripts.

In conventional top-down design, the front-end flow at best predicts the timing and area results to be generated by the back-end flow. In contrast, in the present invention, the final set of design constraints from the second-pass chip optimization guarantees a known solution to timing convergence. This is because accurate placement-based wire-load has been used throughout the optimization process and the implementation of individual partitions has been proven feasible. Multiple rapid internal iterations between chip-level and block-level optimization ensure that design constraints for driving the back-end implementation are well-balanced and optimal. These block-level constraints represent a recipe to meet area and performance goals in a single pass through the back-end process, and therefore serve as an effective interface between front-end and back-end implementation in a RTL hand-off design flow.

The present invention supports the above design flow as a built-in, pre-programmed sequence designed to reach timing convergence in a single pass through the back-end automatically for a majority of IC designs. In addition, the present invention provides facilities for manual interventions to refine the automatic result. The built-in optimization sequence can also be modified by the user to adapt the system to unique chip requirements. Manual entry points include control of physical hierarchy construction, control of LBB synthesis, partitioning, pin assignment, floorplan (block and chip-level), creation and selection of block level implementations, in-place optimization, and back-annotation.

The present invention provides numerous advantages over conventional top-down EDA design systems. First, because the RTL timing and power analyses use accurate placement-based wiring parasitics instead of unrealistic statistical wire-load estimates employed by many of today's tools, optimization of the circuit design is possible prior to logic synthesis. This eliminates the multiple design iterations following logic synthesis (or the custom manual design) common with deep sub-micron designs.

Second, RTL analyses of the present invention run at interactive speeds, enabling micro-architecture optimization. The use of LBB and bus representation raises the design abstraction above the conventional bit-wise gate-level representation of a circuit to simplify and accelerate design representation, analysis, and visualization. Since the design flow is completely performance driven, altering the high level constraints (area, timing, power) will result in vastly different chip implementation. Thus, the designer is immediately able to alter the design at any stage of the design flow to test out various alternate designs. This encourages design exploration in a manner not possible with conventional EDA tools.

Third, hierarchical partitioning of the RTL model into efficient silicon structures, such as datapath and complex libraries, can be performed automatically, thereby reducing the time and expertise required to implement efficient design.

Fourth, links to back-end tools may be built to fully automate gate-level optimization and physical implementation. Likewise, links to front-end tools may enable improved behavioral synthesis based on more accurate parasitics and timing estimates.

Fifth, the high-level LBB representation and cross-probing capability between multiple design views provide traceability across multiple design transformations and enable the use of the user-defined RTL model as the 'golden' source throughout the design process. This feature of the present invention is found in the user interface of the RTL optimization system. While the RTL optimization system dramatically restructures and modifies the architecture of the RTL model, the system designer's original source RTL files are preserved as a functional interface for analyzing and probing the electronic design. The designer can thereby identify familiar RTL objects and trace their instantiation through any of the partitions, LBBs, or other entities created by the RTL optimization system.

To facilitate this feature, there is displayed both the logical hierarchy of the RTL and the physical, extracted hierarchy of the electronic design as created by the RTL optimization system. Also, block level diagrams of the LBB network are presented. The user interface windows for the RTL source, block diagrams, physical and logical hierarchies, floorplan, and timing, are linked together so that the designer can cross-probe RTL objects, LBBs, signals, components, variables, and the like at any level of the electronic design, and from any window.

Finally, the present invention essentially provides designers an interactive 'virtual' back-end environment which models physical effects and implementations, thereby enabling front-end micro-architectural optimization at the register transfer level before synthesis. The system automatically searches the solution space and derives an optimal solution for rapid timing convergence. It then generates all necessary data to drive back-end tools to implement that solution. The ability to achieve better silicon efficiency predictably and rapidly, while de-coupling the front-end loop and streamlining the back-end loop, enables a more productive RTL hand-off design paradigm.

BRIEF DESCRIPTIONS OF THE DRAWINGS

Figure 2:
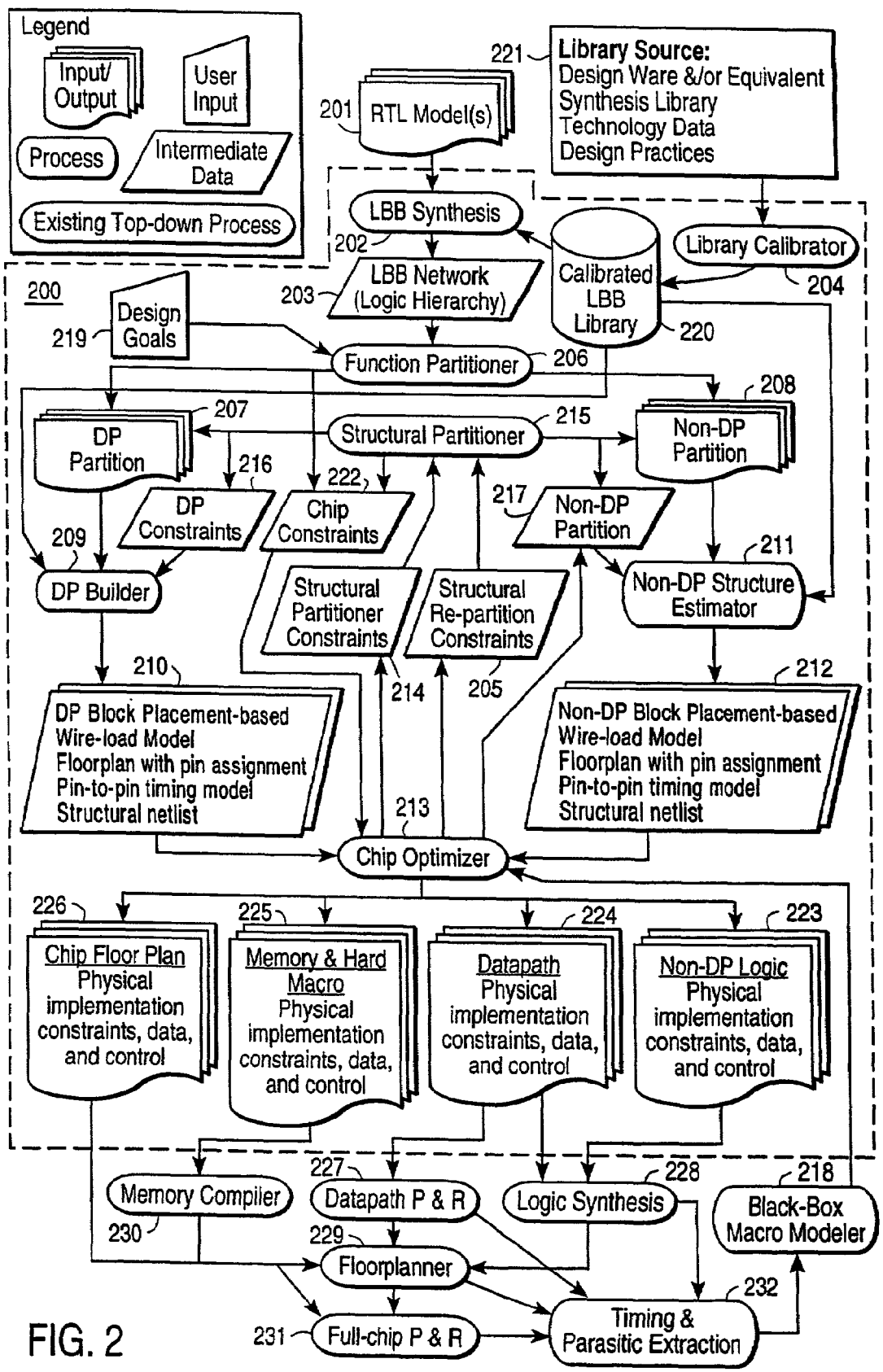
Figure 3:
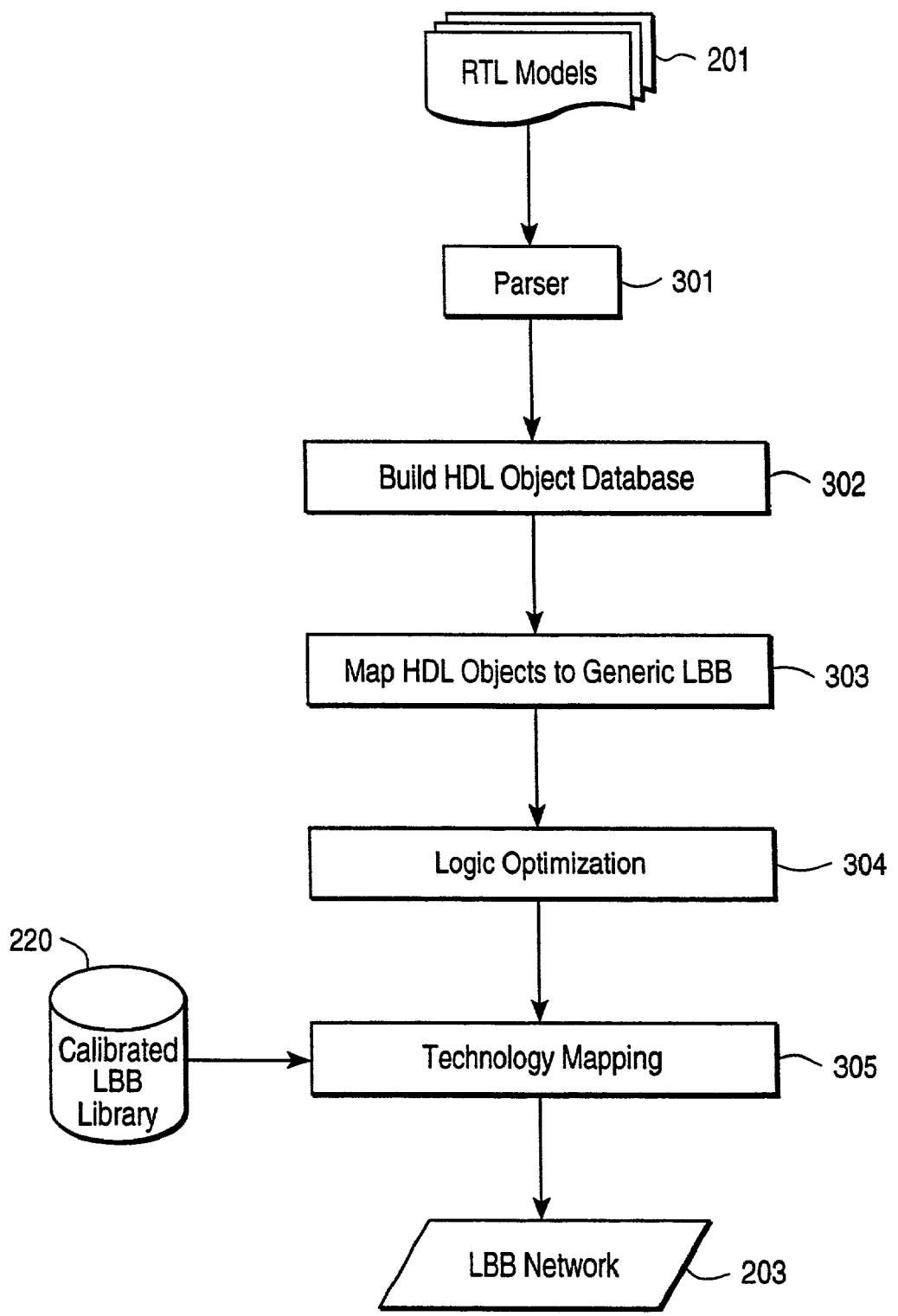
Figure 4:
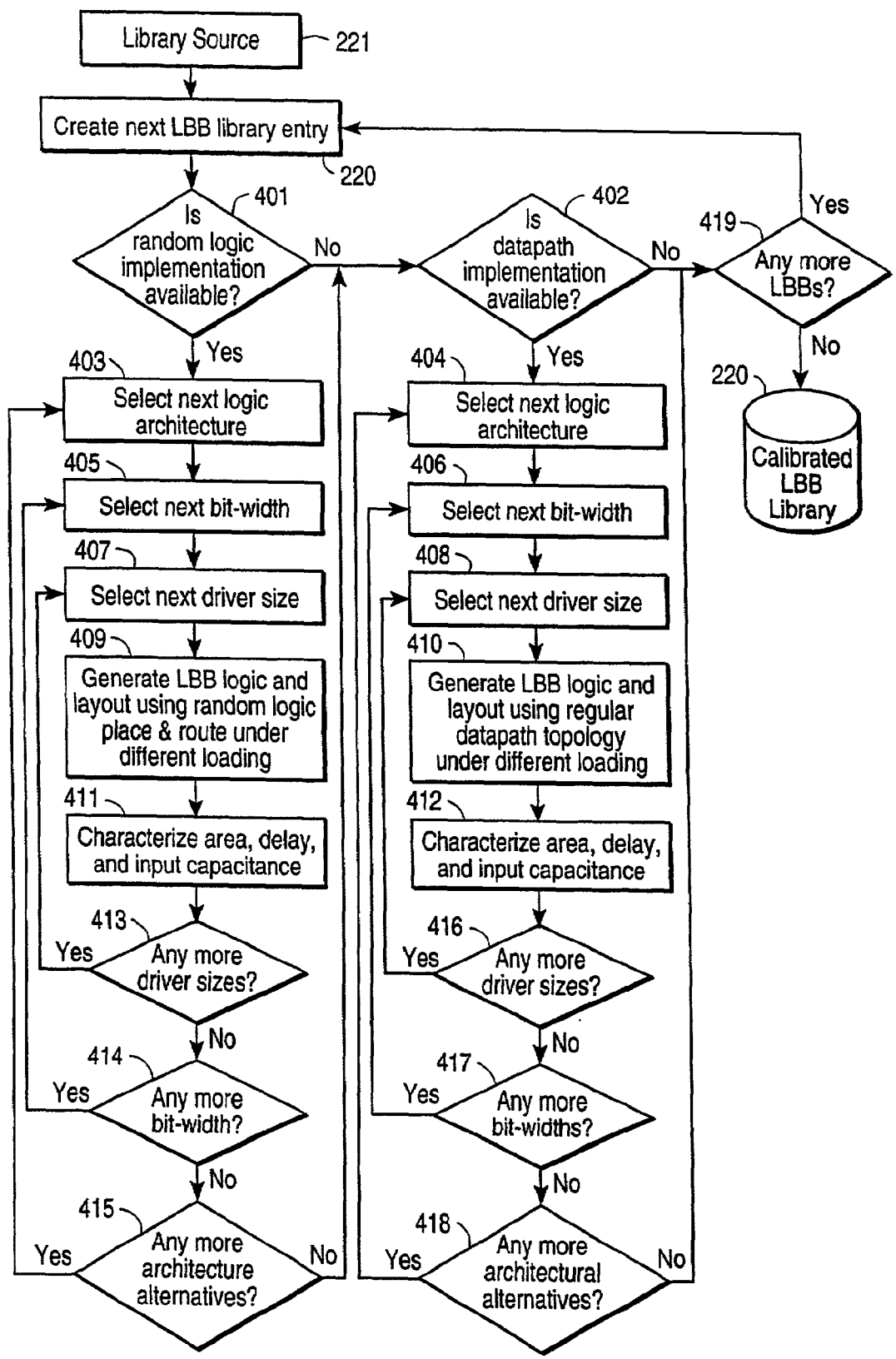
Figure 5:
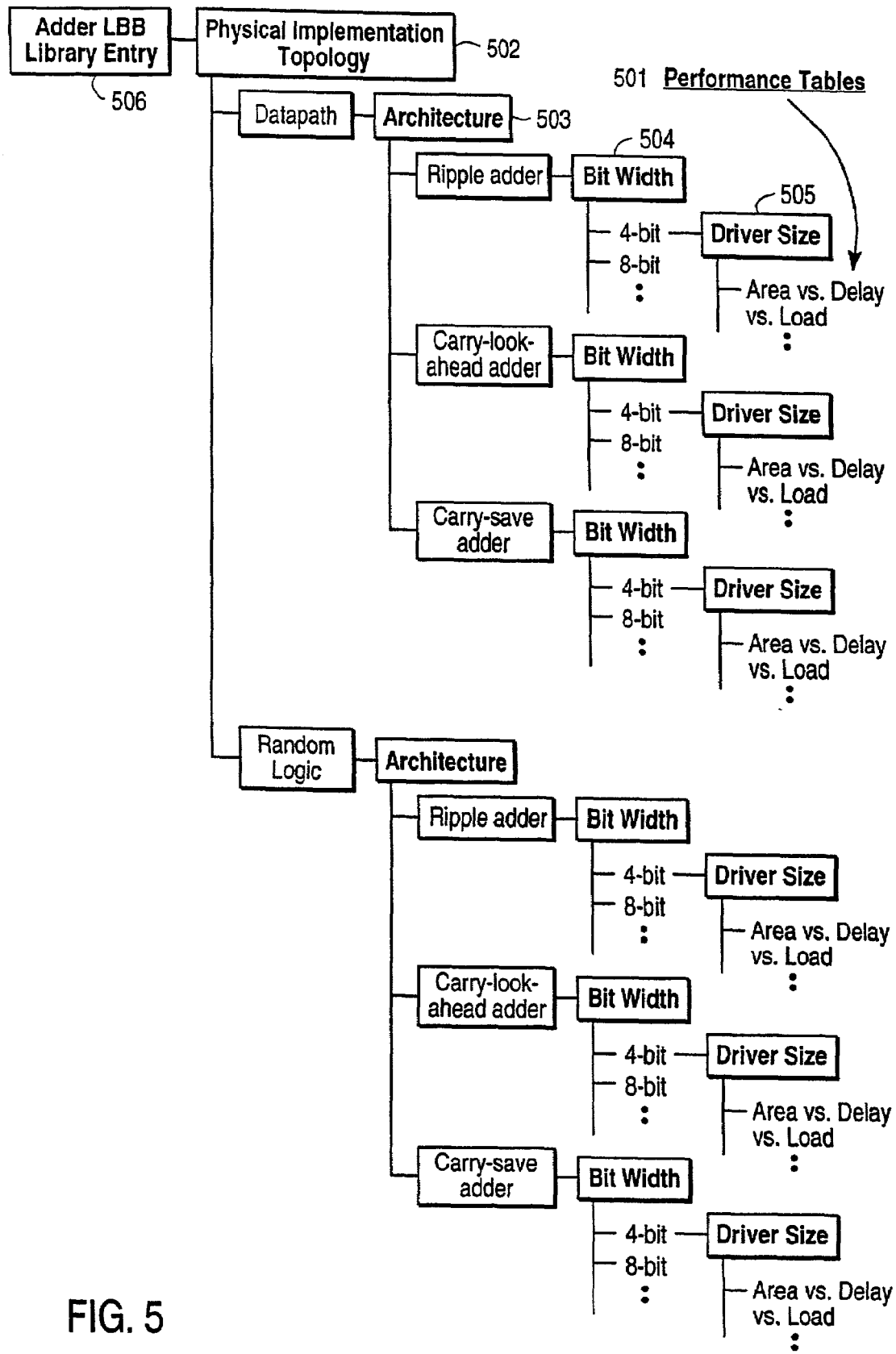
Figure 7:
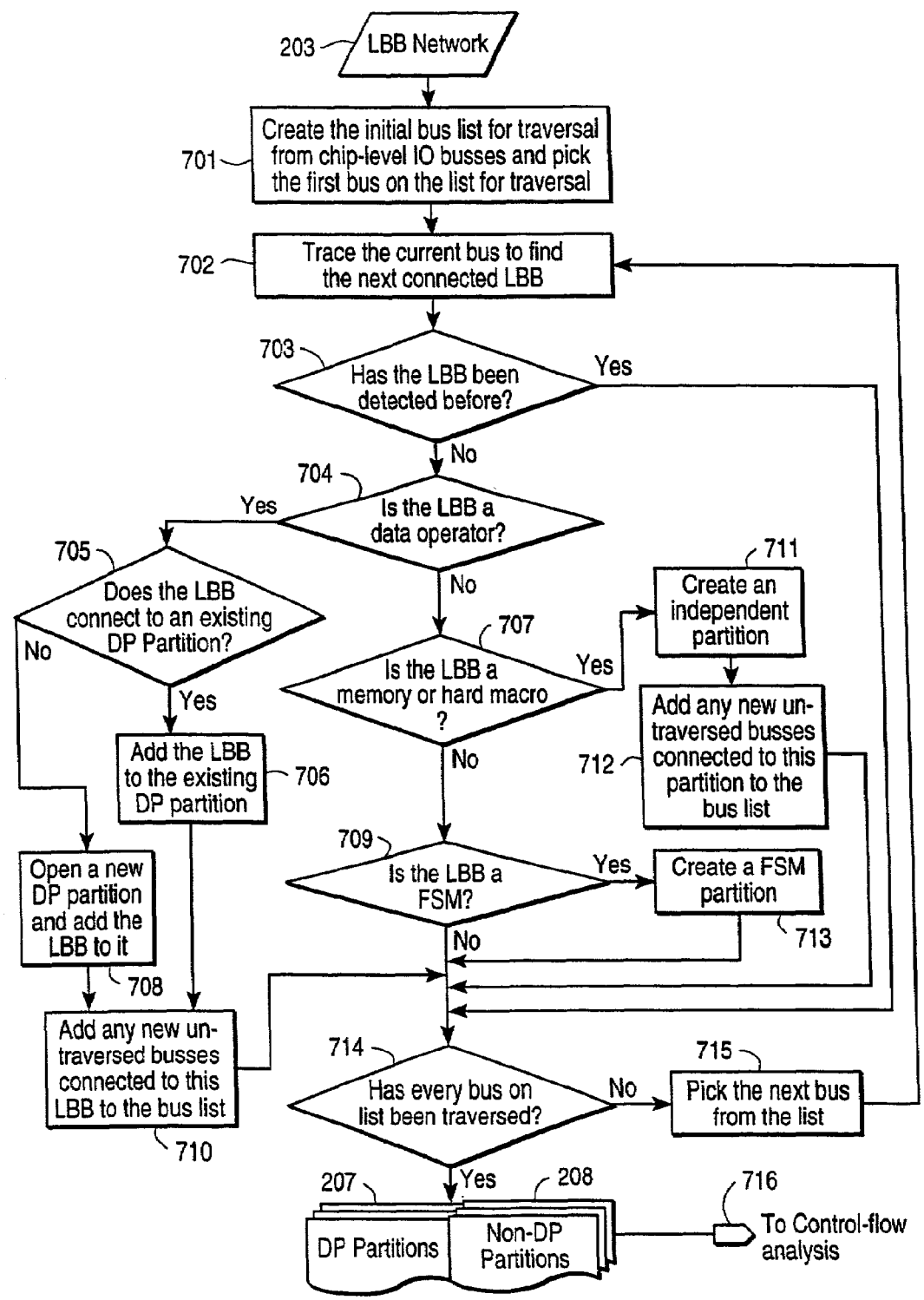
Figure 8:
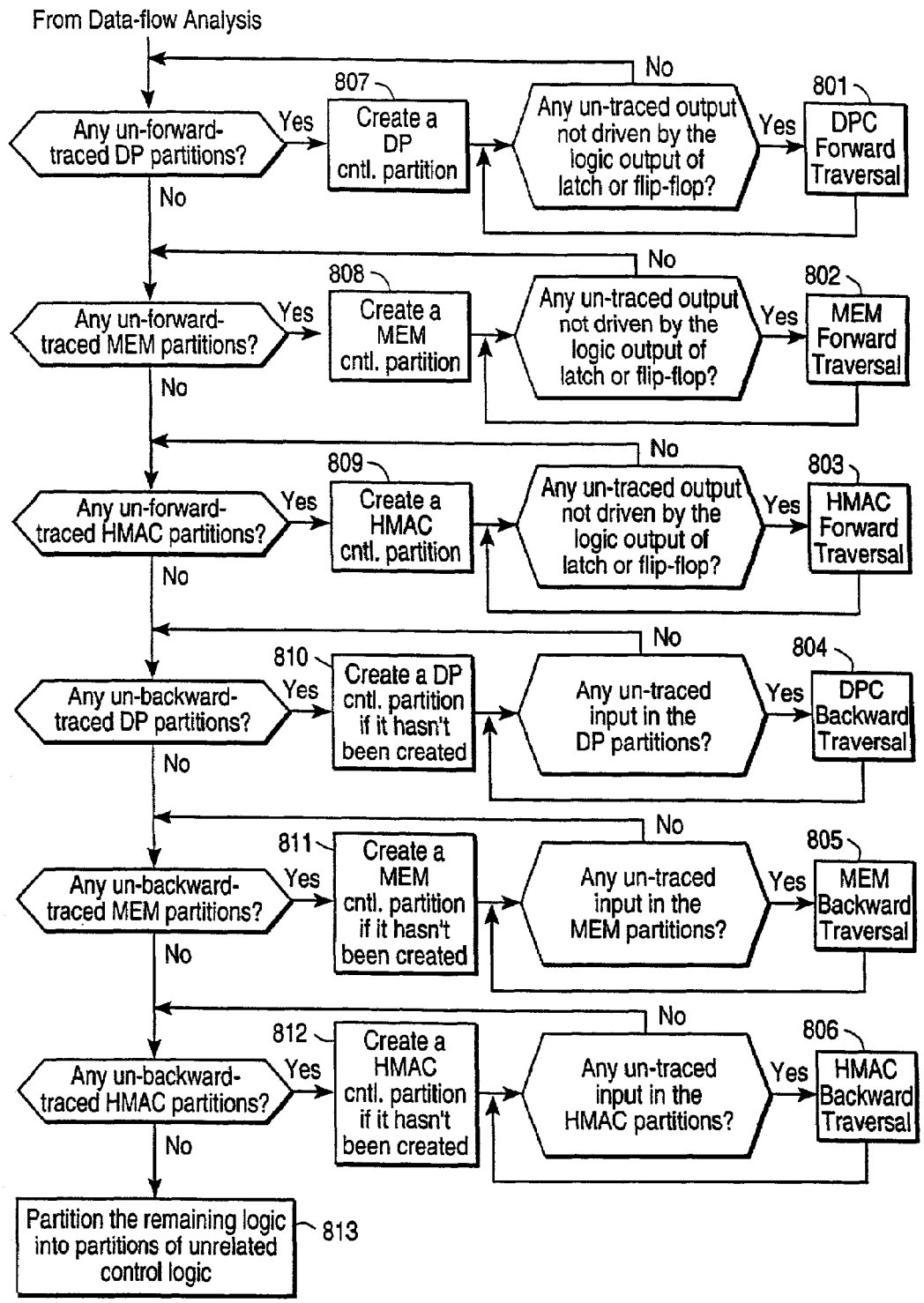
Figure 9:
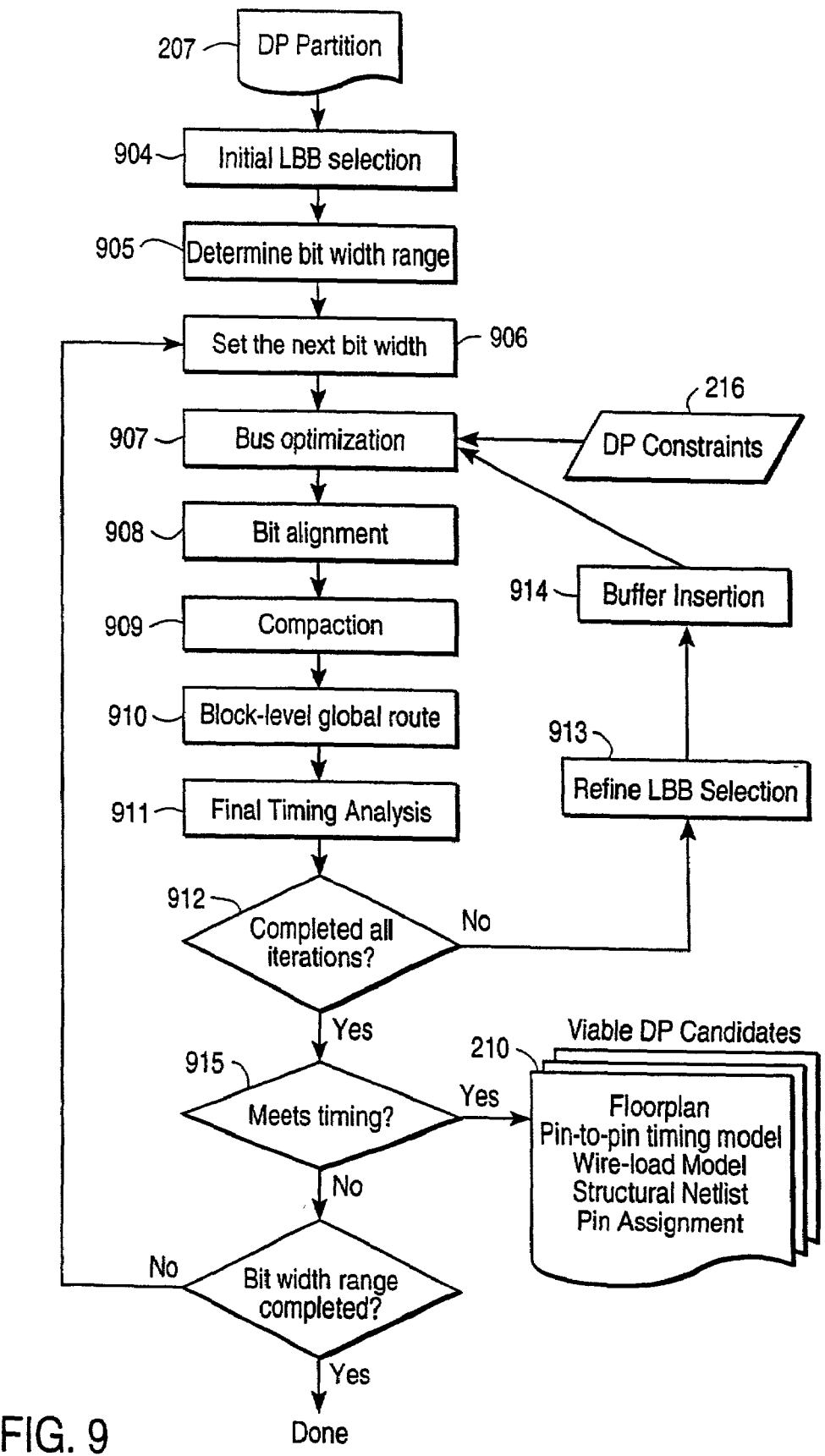
Figure 11:
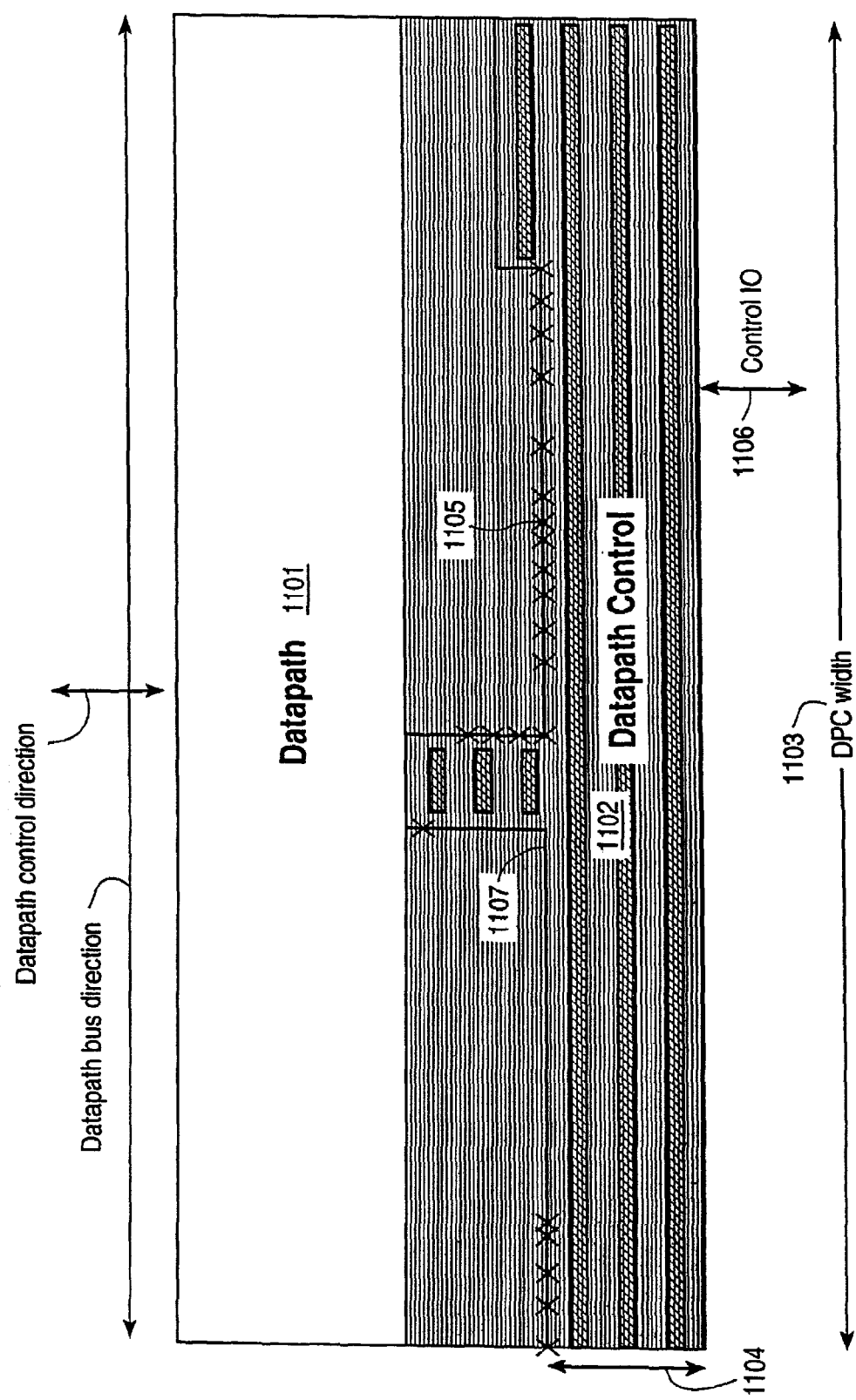
Figure 12:
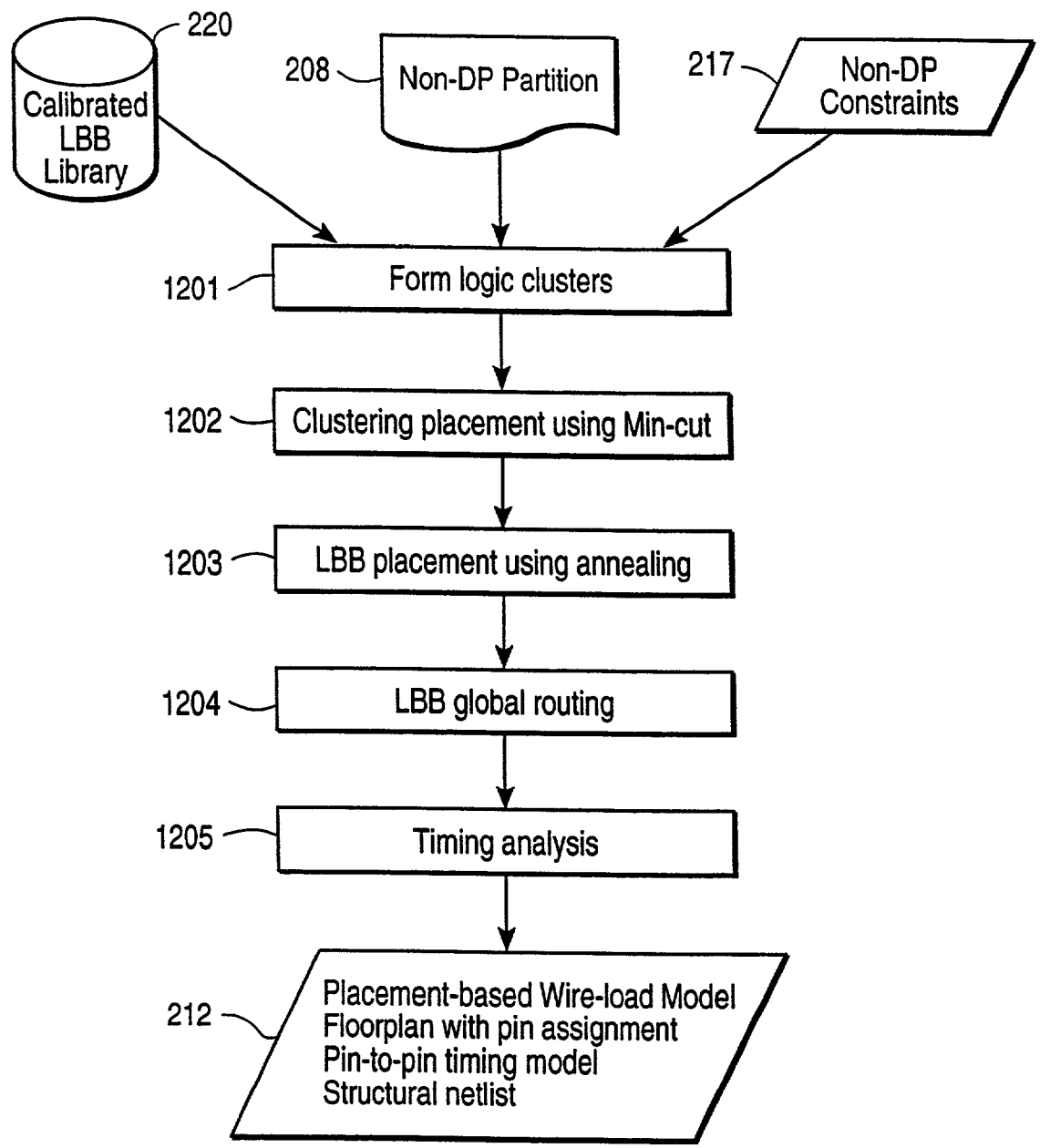
Figure 13:
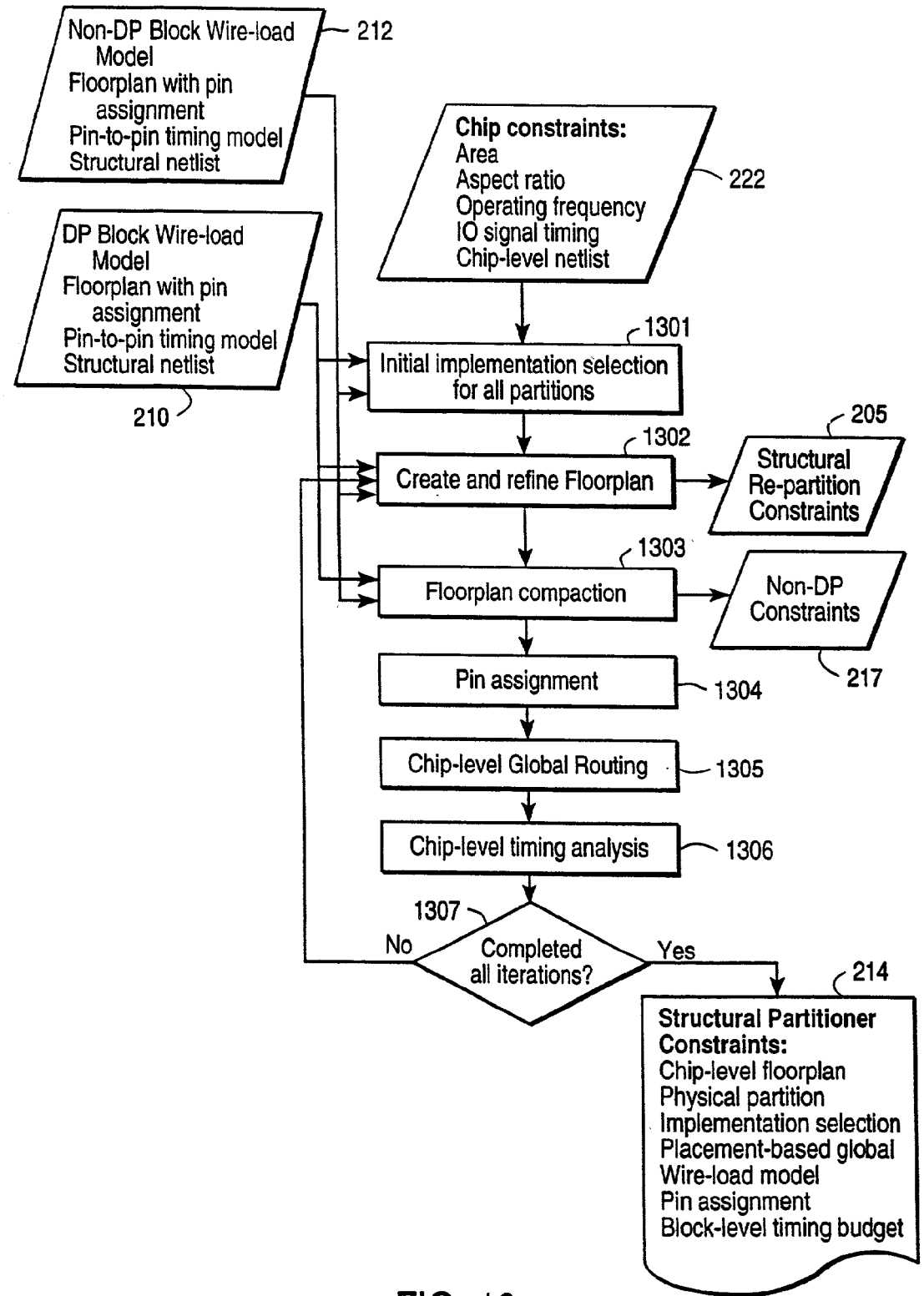
Figure 14:
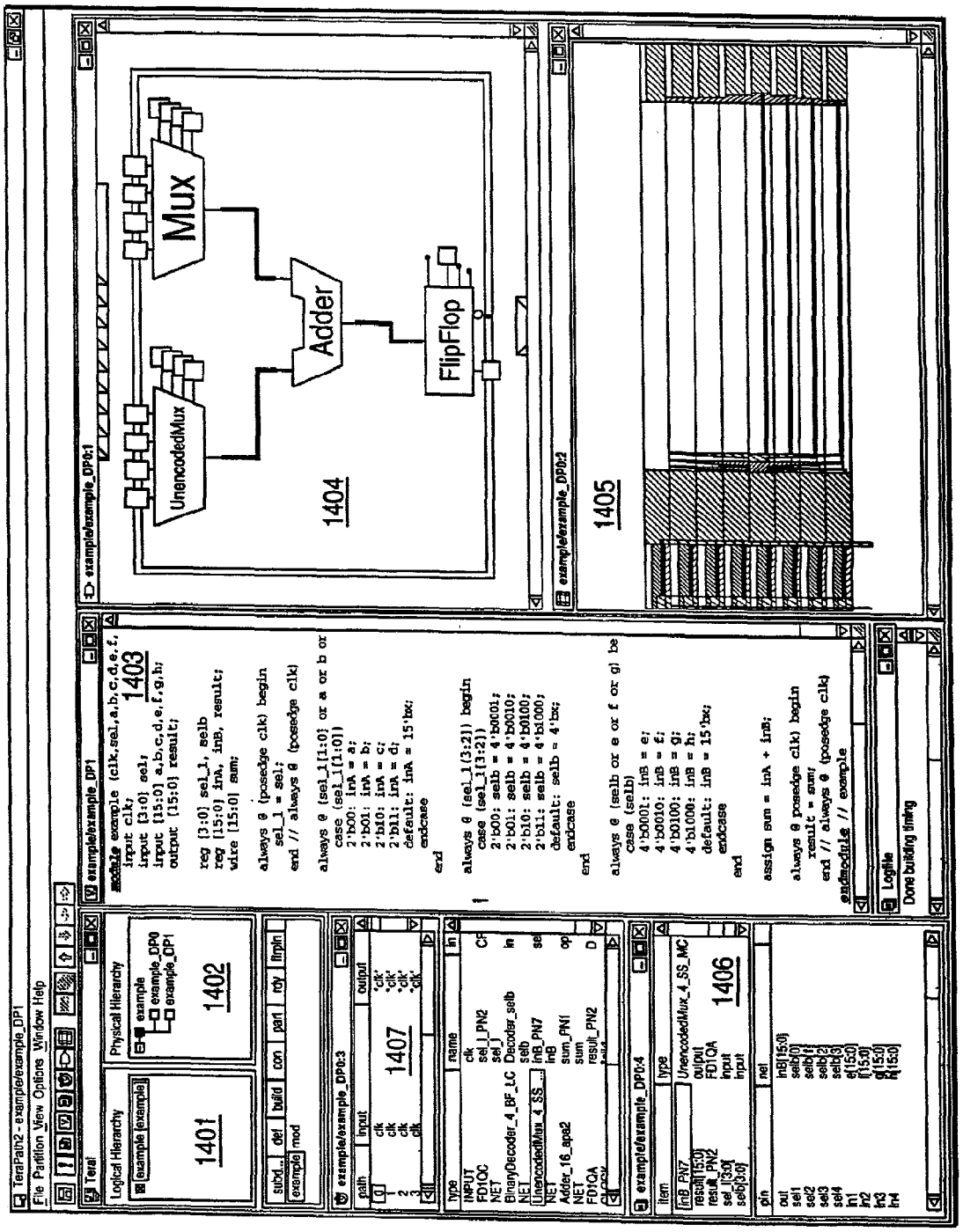

FIG. 1 illustrates a comparison of conventional top-down design methodology with the RTL optimization methodology of the present invention.
FIG. 2 is a data-flow diagram of the RTL optimization system of the present invention.
FIG. 3 is a flowchart of the LBB synthesis process.
FIG. 4 is a flowchart of the LBB library calibration process.
FIG. 5 is an illustration of a LBB Performance Table.
FIG. 6 is a table of LBB types.
FIG. 7 is a flowchart of the functional partitioning process for data-flow analysis.
FIG. 8 is a flowchart of the functional partitioning process for control-flow analysis.
FIG. 9 is a flowchart of the DP Builder process.
FIG. 10 is an illustration of an example of datapath floorplanning and compaction.
FIG. 11 is an illustration of a datapath macro.
FIG. 12 is a flowchart of the random logic estimation process of the Non-DP Structure Estimator.
FIG. 13 is a flowchart of the chip optimization process.
FIG. 14 is an illustration of the user interface of the RTL optimization system.

DETAILED DESCRIPTION OF THE PREFERRED EMBODIMENTS

1. Overview of the RTL Optimization Process

Referring now to FIG. 2 there is shown a data-flow diagram of a RTL optimization system 200 for optimizing an electronic design in accordance with the present invention. The RTL optimization system 200 is designed to converge automatically on the best solution for an electronic design that satisfies the design goals. At the end of the automatic processes provided by the system 200, manual intervention for the purpose of design refinement is allowed.

The following steps are employed in the RTL optimization system 200:
Synthesize 202 the RTL model to a LBB network
Enter chip-level design goals 219
Functional partitioning 206
Feasible block-level implementation 209 & 211
Chip optimization 213
Structural partitioning 215
Chip re-optimization 213 ($2^{nd}$ pass)

The system 200 operates on a conventional computer system, such as an Intel based personal computer using the Microsoft Corp.'s Windows NT operating system. The system 200 may be implemented by software product executing in the computer's memory. The system 200 includes an LBB synthesis module, a functional partitioner module, a structural partitioner module, a datapath builder module, a non-datapath structure estimator module, a chip optimization module, and a library calibrator module.

The system 200 interfaces with conventional back-end tools including a memory compiler 230, a datapath place-and-route tool 227, a logic synthesis tool 228, a floorplanner 229, a full-chip place-and-route tool 231, and timing and parasitic extraction engine 232.

The following sections describe the RTL optimization system 200 in detail.

2. RTL Model

The preferred entry point into the design flow is a RTL model 201 of an electronic design or system. The physical implementation of the electronic design can be an Integrated Circuit (IC), part of an IC, or multiple ICs on a circuit board. The RTL model 201 describes the function of the electronic system using a Hardware Description Language (HDL) such as Verilog or VHDL. The RTL model 201 may be either directly written by a system designer, or generated from a behavioral model using behavioral synthesis. In addition, the RTL model 201 may be extracted directly from internal data structures of a behavioral model without undergoing RTL model construction.

3. Synthesis into Logic Building Block (LBB)

The RTL model 201 is synthesized 202 into a network of Logic Building Blocks (LBBs) 203. A LBB is a technology independent description of a logic structure that has performance data fully characterizing its performance envelope over a range of different physical implementations. Preferably the performance data quantifies the relationship between circuit delay and output load, for both random logic and datapath implementations of the LBB. This performance data defines the relationships for each of a plurality of bit widths, and for each of a plurality of driver sizes for various typical loading conditions, and for each of a plurality of feasible logic implementations. LBBs range from simple gates (inverter, NAND, latch, flip-flop) to complex logic structures such as adder, finite state machine, memory, and encoder. Storing this data in the LBB fully characterizes the performance envelope of the LBB over its range of feasible physical implementations and variations in area, aspect ratio, and implementation architecture.

FIG. 3 shows the synthesis steps that transform an RTL model 201 into a LBB network 203. The parser 301 converts HDL statements in the RTL model 201 into a language-neutral HDL object database 302. HDL objects are mapped into generic LBBs to create a technology-independent LBB network by processing latch inference, 'case' constructs, 'if' constructs, assignments, and expressions. In this pass, the smallest LBB implementation is chosen as the initial candidate. In this case, only the area data in the performance tables 501 of the LBB library 220 is used.

Bus signals are preserved as integral entities, not individual signals:

1. All explicit bus-oriented structures, expressed in explicit bus declaration in the RTL model, are preserved and represented as bus entities.
2. All implicit bus-oriented structures, such as those expressed as repeated RTL constructs and vectorized instantiation across multiple bits, are recognized and preserved as bus entities.
3. All LBB types, except finite state machines and hard macros, can be used in random logic or in multi-bit datapath with corresponding characterization data supporting either usage. When a LBB is connected to a bus entity, it becomes a data operator. Data operators are multi-bit LBBs that can store, steer, or transform data. For example, a register stores data; a multiplexer and a shifter steer data; an adder transforms input data to different output data; and a decoder data operator transforms input data to control signals.

HDL objects are mapped using the highest logic structure available in the LBB library 220 to reduce complexity. For example, a multi-bit adder is represented as an integral adder LBB. In contrast, conventional logic synthesis reduces the adder down to potentially hundreds of individual gates. Another example, a 'case' construct, is mapped a multiplexer and a decoder.

Only Boolean expressions not mappable into complex LBBs are mapped into networks of simple gate-level LBBs. The block diagram window 1404 in FIG. 14 shows a graphical representation of an example of a LBB network 203.

The logic of the technology-independent LBB network is optimized 304. LBBs in the optimized network are mapped 305 into technology-specific LBBs derived from the calibrated LBB library 220 to produce the final LBB network 203.

3.1. Calibrated LBB Library

LBBs are supported by a characterized LBB library 220 that represents the performance envelop of a large number of LBBs. LBB characterization is performed once, and off-line, by the library calibrator 204 when an IC fabrication process and a library is incorporated into the system 200 of the present invention. Inputs 221 to the library calibrator 204 consist of standard logic synthesis cell library, complex libraries for datapath, process technology data, implementation styles information, and implementation tool information. In the characterization process, logical and physical implementations of each LBB are built and characterized by varying some or all, individually or in combination, of the following input parameters that affect the area and speed of a LBB physical implementation.

Variable layout style such as regular datapath topology and random logic place & route topology.

Variable architecture for LBB that can be implemented using alternative logic implementations (e.g., ripple adder, carry-look-ahead adder, carry-save adder)

Variable bit width for LBB that supports multi-bit data operator configurations.

Output driver size.

Output loading.

Process parameters (best, typical, worst case, and the like).

Temperature and power supply voltage.

LBB area and performance data are stored in two forms in the calibrated LBB library 220 for access by the system 200 during performance optimization: data tables and circuit generators.

3.1.1 Data Tables

The number of possible implementation variations of a LBB depends on the richness of the library source 221. FIG. 5 illustrates the format of the LBB in the calibrated library 220 using data tables. In this format, each LBB is characterized by variations in implementation topology 502, architecture 503, bit width 504, and driver size 505. For each of these variations, a performance table 501 quantifies the relationship between area, delay, and output load. An adder, shown in FIG. 5, is one example of a LBB with a rich set of implementation possibilities. A hard macro block represents less variation in implementation. It has only one fixed physical implementation and a pre-characterized timing model.

FIG. 4 shows a flowchart for the LBB library calibrator 204 used to generate the data tables, with the complete characterization flow for a LBB with a full range of variations. Generally, for each library entry, it is determined 401, 402 whether random logic and/or datapath implementations are available. For each implementation, variations of logic architecture 403, 404, bit width 405, 406, and driver size 407, 408 are processed to generate 409, 410 a placed and routed implementation. For this implementation, timing, area, and input capacitance are measured 411, 412. This capacitance information is used during timing analysis to compute the total load presented to the previous logic stage.

This data is stored in the performance table for the appropriate implementation, architecture, bit width, and driver size. Pre-characterized scaling factors are used to scale the data in these tables to compensate for variation in process, temperature, and voltage.

3.1.2 Circuit Generators

In an alternate embodiment, circuit generators or estimators fast enough to generate performance data based on input parameters at run-time are used. This approach eliminates the need for pre-characterization and storage of characterization data. Circuit generator results are cached so that circuits with the same configuration are generated only once.

3.2 LBB Types

A single LBB may contain the equivalent of several hundred gates found in a typical synthesis library. FIG. 6 shows an example of a set of built-in LBB types sufficient for efficient representation of a typical digital system. All LBB types accept bus signals are represented as a single entity. All LBB types, except finite state machines and hard macros, are parameterized (n-bit width) to support bus operations.

The higher level abstraction of the LBB representation offers the following advantages:
- Reduces the sizes of design databases by orders of magnitude vs. gate-level tools. This translates into smaller memory requirements for complex designs and faster analysis run-times.
- Reduces the complexity of the logic network and allows high speed full-chip analysis.
- Makes RTL visualization more efficient. It overcomes the unstructured nature of HDL and elevates the users from the tedious complexity of viewing a gate-level schematic.
- Postpones running gate-level synthesis and the burden of synthesis details until later in the design cycle.
- Leverages complex and pre-characterized library from multiple sources.
- Preserves bus structures in analysis and visualization.

4. Design Goals

Chip-level design goals 219 include operating frequency, area, aspect ratio, chip IO timing, and IO pad locations. Timing convergence at minimum area is achieved through an alternating series of chip-level and block-level optimization.

5. Functional Partitioning

Functional partitioning is the first step in a chip-level timing convergence process by creating a first set of top-down constraints in terms of a network of physical partitions. It breaks the "chicken and egg" inter-dependency cycle between creating optimal block-level implementations before chip-level constraints are known and creating optimal chip-level constraints before block-level implementations are known. The cycle is broken by performing a first partitioning 206 of the LBB network 203 into physical partitions 207,208. Since the chip-level constraints are not known at the functional partitioning 206 step, the process is designed to be self-correcting during structural partitioning 215. Accordingly, the boundary between physical partitions are not required to be optimal at the functional partitioning stage.

Functional partitioning is a structural recognition process. The functional partitioner 206 separates logic into well-understood silicon structures that have proven optimal logical and physical implementation techniques. The implementation of these silicon structures are supported by specialized implementation tools and libraries available commercially, such as Cadence Design Systems, Inc.'s SmartPath product. The well-understood physical structure and timing behavior of these silicon structures enable accurate 'bottom-up' estimations.

Present well-understood silicon structures include datapath (DP), finite state machine (FSM), memories (MEM), and random logic (RL). Even though these structures are commonly used in digital designs, their precise boundaries in the RTL model 201 are not always obvious to the designer. As a result, the logical hierarchy in the RTL functional description usually does not reflect optimal physical partitioning for the implementation of these silicon structures. For example, data operators belonging to a single datapath partition may be scattered in many RTL modules in different logical hierarchies. The functional partitioner 206 identifies such related structures and creates a single physical hierarchy from them.

Data signal traversal, followed by control signal traversal, accomplishes partitioning and structural recognition in parallel. The result is the separation of datapath partitions 207 from other logic classified as non-datapath partitions 208. A partition contains one or more LBB. Datapath (DP) partitions contain data operators. Non-datapath partitions contain either FSMs, MEMs, hard macro block (HMAC), or RL.

5.1 Data-flow Analysis

The functional partitioning 206 process creates a FSM partition and data-flow-logic partitions: DP, HMAC, and MEM partitions. Data-flow analysis is a depth-first traversal of bus signals across all hierarchy levels in the LBB network 203.

5.1.1 DP Partition

Data-flow analysis separates data operators, FSM, HMAC, and MEM from the LBB network by tracing bus connections. It further groups inter-connected data operators into a DP partition. Data operators in a DP partition can vary in bit-width. Independent bus systems in the design result in multiple independent DP partitions.

5.1.2 Finite State Machine (FSM)

FSMs conform to RTL modeling style well understood in present top-down design methodology. FSM is a basic LBB recognized at the synthesis step. Each FSM forms its own partition.

5.1.3 Memories (MEM)

Memories are regular blocks such as RAM, ROM, Cache, etc. When the functional partitioner 206 encounters a memory block in the data signal traversal process, it creates a memory partition. Memory blocks are special data operators with data bus and control connections.

5.1.4 Hard Macro Blocks (HMAC)

Hard macro blocks are recognized from explicit instantiation in the RTL model. Each hard macro block forms an independent partition.

5.1.5 Data-flow Analysis Process

Referring now to FIG. 7 there is shown the data-flow analysis of the functional partitioner 206. Traversal begins with identifying 701 an initial list of I/O busses at the top-level hierarchy of the design under analysis. Beginning with a current bus, the bus is traced 702 to find a next LBB that is connected to the bus. A check 703 determines if the LBB has been visited before. If not, then the LBB is checked 704 to determine if it is a data operator for a datapath. If so, the LBB is checked 705 to determine if it connects with an existing DP partition. If so, the LBB is added 706 to the existing DP partition. Otherwise, a new DP partition is created 708, and the LBB is added to it. In either case, any new untraversed busses connected to the LBB are added 710 to the bus list. Traversal of the bus list continues 714 until completed.

If the LBB was not a datapath operator, it is checked 707 to determine if it is a memory or a hard macro. For these LBBs, a new partition is created 711, and again untraversed busses are added to the bus list 712. Finally, if the LBB is not a memory or hard macro, it is checked 709 to determine if it is a finite state machine. Here, a FSM partition is created 713.

If an LBB is not a datapath operator, MEM, HMAC, or FSM then it is passed to control-flow analysis.

At the end of the data-flow analysis process, a control analysis process (FIG. 8) is used to form control logic partitions associated with partitions created in the data-flow analysis process.

5.2 Control-flow Analysis

The control-flow analysis process of functional partitioning 206 creates random logic partitions using the data-flow-logic partitions (DP, MEM, HMAC) created in the data-flow analysis process as anchor points. Control-flow analysis performs depth-first forward traversal from the output control signals and backward traversal from the input control signals of all data-flow-logic to form closely associated control partitions. The close association between these control logic partitions and the data-flow logic they control form natural clusters in the chip-level floorplanning process. Control-flow analysis results in the non-datapath partitions 208.

FIG. 8 shows the application of a series of backward and forward traversals on DP, MEM, and HMAC physical partitions. The control logic of a DP partition 207 is formed by the combined effect of forward traversals 807, 801, and backward traversals 810, 804. The control logic of a MEM partition is formed by the combined effect of forward traversals 808, 802, and backward traversals 811, 805. Forward traversals 809, 803, and backward traversals 812, 806 form the control logic of a HMAC partition.

Depth-first forward traversals 801, 802, 803 are applied to input signals not driven by the logic output of a latch or flip-flop. If the traversal reaches a physical partition boundary, the chip boundary, a latch, or a flip-flop, the traversal on the current path stops. Any LBB encountered will be added to the current control partition if it has not previously been partitioned into a physical partition.

Depth-first backward traversals 804, 805, 806 are applied to output signals. If the traversal reaches a physical partition boundary, the chip boundary, a latch, or a flip-flop, the traversal on the current path stops. Any LBB encountered will be added to the current control partition if it has not previously been partitioned into a physical partition.

A random logic partition 813 is formed by the remaining LBBs not included in any control logic partitions. This random logic partition will be further divided into multiple random logic partitions if clusters of LBBs are unrelated.

The effect of the control-flow analysis process is to maximize the likelihood that single-cycle logic stays in the same partition and a partition's input/output signals are latched.

5.3 Logical Hierarchy to Physical Hierarchy Transformation

The combined effect of data-flow and control-flow analysis by the functional partitioner 206 is the transformation of the logical hierarchy inherent to the RTL model 201 into a physical hierarchy optimized for chip-level physical implementation. The physical hierarchy is defined by the connectivity and hierarchical relationship of physical partitions created in the data-flow and control-flow analysis processes, which may be different from the logical hierarchy of the RTL model 201.

6. Block Level Implementation Feasibility

For each physical partition (stored in DP and Non-DP partitions 207, 208) created by the functional partitioner 206, a range of feasible block-level physical implementation estimation models 210, 212 are generated automatically. Feasible implementation models 210 can vary in area, aspect ratio, power consumption, or timing, provided that all critical paths within a block must at least meet the minimum operating frequency requirement of the chip. Each block-level estimation model 210, 212 consists of:

A pin-to-pin timing model suitable for chip-level analysis.

A placement-based wire load model internal to the partition.

A block-level floorplan with pin assignment.

A structural netlist 6.1 Datapath Partition

A Datapath Macro (DPM) consists of a semi-regular portion of data operators (DP partition) and a random section of Datapath Control (DPC) logic as shown in FIG. 11. Data operators are arranged in rows and columns so that control signals and busses achieve maximum alignment for optimal density and speed.

6.1.1 DP Construction

FIG. 9. depicts the detailed datapath building process performed by the datapath builder 209. Inputs to the datapath building process include the LBB network of the DP partition 207 created by the functional partitioner 206, operation frequency timing constraints 216 for critical paths internal to the DP partition, and timing constraints 216 for logic paths that end outside the DP partition. When the DP builder 209 is run for the first time in the RTL optimization process, only the minimum operating frequency is known, as specified in the design goals 219. In this case, only the timing of internal paths of the datapath partition is optimized. Both internal and external paths are optimized together when external timing constraints 216 become known in subsequent executions of the datapath builder 209.

The smallest LBB implementation is selected in the initial selection 904 of the individual LBB implementations in the calibrated LBB library 220. Alternate DP physical implementation models 210 are created by varying 906 the bit-width of the datapath. Varying bit-width creates a number of feasible DP implementation models 210 with different aspect-ratios. The feasible bit-width range of the DP partition is determined 905 by $X/4 \leq \text{bit-width} \leq 2X$, at 1-bit increments 906, where X is the bit-width of the widest data operator in the DP partition.

6.1.2 DP Placement Optimization

The order of data operators in the bus direction 1001 is first optimized 907 to minimize bus length and meet timing constraints. Data operator order optimization is performed at the LBB level to speed up processing time.

Data operators along a critical timing path within the DP are clustered in close proximity. A 'snaking' path is formed when a critical path extends beyond the DP into DPC and then sometimes re-enters the DP. A snaking path may contain multiple sections of data operators. These sections are clustered together even though they are connected indirectly through random logic in DPC.

After bus optimization, data operator placement is optimized in the control direction 1002 aligning 908 busses at the bit level so that busses run straight across the DP. Bit alignment 908, performed mostly at the LBB level, employs the following techniques:

Fold bits in data operators wider than the DP bit-width.

Spread apart bits in data operators narrower than the DP bit-width.

Shift the entire data operator along the control direction to minimize bus wire bending.

A compaction 909 step is used to pack data operators to minimize area while meeting timing. Compaction employs the following techniques:

Merge data operators that don't occupy every bit position.

Stack multiple narrower data operators end-to-end to fill the entire bit-width.

Move data operators to fill any space as long as timing constraints are met.

FIG. 10 shows an example of floorplanning and compacting six data operators of varying bit-width (4, 8, 16) into a datapath with a bit-width of 8. Data operator A is folded from 16-bit into 8-bit. Data operators C and D are stacked end-to-end. Data operators E and F are spread apart and then merged.

The compacted DP is globally routed 910 and timing analyzed 911 to obtain the first floorplan.

6.1.3 DP Logic Optimization

An iteration loop 912 is set up to refine the initial result through an alternate series of placement and logic optimization. The following steps are employed in the logic optimization process:

1. Refine LBB selection 913—select faster LBB (better architecture and higher drive) in the LBB library to meet timing at the expense of area or select smaller LBB to reduce area as long as timing is met. The selection of a LBB is a table look-up process in which the performance tables 501 for LBBs with various driver sizes 505 and alternative architectures 503 are searched. A LBB implementation will be chosen if it is the smallest LBB satisfying the timing constraint.

2. Buffer Insertion 914 for signals with heavy load.

6.1.4 Viable DP Implementation Candidates

Datapath implementation models are varied by altering (906) the bit width of the datapath. As long as the block satisfies 915 the minimum chip operating frequency according to the result of timing analysis 911, it is considered a viable candidate, and added to the block estimation models 210. The smallest area implementation (in the block estimation models 210) is not necessarily the best choice because blocks with a different aspect ratio may actually produce a better overall chip design even though the block itself may be larger.

6.2 Non-datapath structures

Non-datapath structures include control logic (for DP, MEM, HMAC), random logic, finite state machines, memories, and hard macro blocks. Control logic and FSM are special forms of random logic with additional constraints. The non-DP estimator 211 generates a feasible implementation estimation model, 212 for non-datapath structures.

6.2.1 Non-DP Structure Estimator

The non-DP structure estimator 211 generates block estimation models 212 for random logic, finite state machines, memories, and hard macro blocks. Random logic estimation is based on standard cell physical implementation techniques. FIG. 12 shows the random logic estimation process of the non-DP structure estimator 211. A random logic block is partitioned 1201 into small clusters of highly connected LBBs. Cluster-level placement 1202 is performed by a Min-cut algorithm. An annealing algorithm 1203 refines the LBB placement for a global routing 1204. The global routing forms the basis for a placement-based wire-load model 212 for wires both within and between LBB clusters. The final timing analysis 1205 creates a pin-to-pin timing model for chip-level optimization 213.

The flexible nature of the standard cell place-and-route topology can potentially create an infinite combination of aspect ratio variations and I/O pin assignments. The non-DP structure estimator 211 responds to requests from the functional partitioner 206, the structural partitioner 215, and the chip optimizer 213 to create random logic estimations 211 under different constraints 217 during various steps in the RTL optimization process. The functional partitioner 206 initiates the first rough estimation with no constraints, and a default random logic block aspect ratio of 1:1 is used. The chip optimizer 213 and the structural partitioner 215 request random logic area and speed estimation by providing pin assignment and aspect ratio constraints.

6.2.2 Datapath Control Logic

Even though DPC logic is created using standard-cell place and route, the block topology is highly constrained by the regular nature of the DP block it controls. The present invention allows additional constraints to be imposed on DPC logic according to the datapath it controls. As illustrated in FIG. 11, in a DPC 1102 block, one dimension 1103 is required to be equal to the length of the DP side where control I/O signals exit the DP 1101. The number of random logic LBBs and the amount of wiring overhead in the DPC block dictate its other dimension 1104. Furthermore, the terminal location 1105 on the DP side is completely constrained and defined by the optimal placement of data operators in the DP. Other I/O signals naturally exit the DPC block from the opposite side 1106. Occasionally, I/O terminals also exit from the remaining two sides of the DPC block. DP and its associated DPC form a natural cluster; as a result, these partitions always stay together, and need not be later re-analyzed to consider whether they should be reclustered. The abutment between DP and DPC is not always regular. The placement of the flexible DPC logic can match the irregular contour 1107 of the DP so that the combined DPM block achieves maximum packing density.

Once the pin assignment and aspect ratio of a DPC block are determined, the area/speed estimation process is identical to that of an ordinary random logic block.

6.2.3 Finite State Machines

From the physical implementation perspective, a finite state machine is also a special form of random logic. A finite state machine has a well-defined logic architecture which divides the logic into multiple sections: input latches, output latches, state-bit logic, and AND-OR logic for control outputs. The natural logic separation forms the basis for clustering of LBB within the finite state machine.

The estimation process for finite state machines is similar to that of random logic.

6.2.4 Memories

Aspect ratio, area, IO pin assignment, and timing information are derived from pre-characterized memory libraries. Alternate feasible implementations will be presented for chip-level optimization if the library is capable of generating them.

Memory control logic is estimated similar to DP control logic.

6.2.5 Hard Macro Blocks

A hard macro has a pre-defined implementation supplied by the user. Area and performance are pre-characterized and no estimation is needed. HMAC control logic is estimated similar to DP control logic.

7. Chip-Level Optimization

The chip optimizer 213 performs chip-level optimization and produces structural partitioner constraints 214 to refine the block level implementation models 210, 212. FIG. 13 depicts the creation of a floorplan in the chip optimization process 213. Inputs to this process include chip-level constraints 222 and a collection of feasible physical implementation models 212, 210. Chip-level optimization 213 outputs structural partitioner constraints which include:

Chip-level floorplan
Physical partition
Implementation model selection for each partition
Placement based global wire load model
Pin assignment
Block level timing budget.

The pattern of data-flow and control-flow resulted from the partitioning steps forms the initial clustering of physical blocks. Data-flow-logic and its associated control logic form natural clusters in the initial floorplan. The placement of the clusters is initially computed by a force-directed method and then iteratively improved by packing the clusters along the x direction and y direction. For each partition 207, 208, an initial block-level implementation model 1301 is selected from its accompanying block implementation models 210, 212. The initial selection for each partition is the smallest block in the set of feasible implementations 210, 212. An initial floorplan using all of the selected implementations is created 1302 based on minimum wire length along the critical paths.

The initial floorplan may contain overlap and unused space, which is removed in the compaction step 1303. Compaction involves local movement of blocks and refinement of the block-level implementation model selection. The floorplan compactor 1303 has multiple options in refining the block-level implementation selection. It may pick alternate blocks in the set of feasibility DP blocks 210 or Non-DP blocks 212. It may make continuous adjustment to the size and aspect ratio of random logic partitions 208 by modifying constraints 217 and invoking the Non-DP structure estimator 211 to produce refined block estimation models 212 for the modified partitions. It may also generate structural re-partition constraints 205 and invoke the structural partitioner 215 to split and merge partitions in order to precisely control the size and shape of blocks for better timing and area efficiency. Changes by the structural partitioner 215 induce revisions of the block estimation models 210, 212 by either the DP builder 209 for the modified DP partitions or the non-DP structure estimator 211 for non-DP partitions 208.

Automatic pin assignment 1304 optimizes overall wire length to derive a first-pass chip floorplan. The first-pass chip floorplan is then globally routed 1305 to produce more accurate parasitics and timing 1306 for a second-pass refinement in physical implementation selection and pin assignment. The two-pass approach 1307 is completely automatic. A final global re-route 1305 and full chip timing analysis 1306 are used to determine slack and redistribute timing budget among blocks and generate new structural partitioner constraints 214.

8. Structural Partitioning

Structural partitioning 215 refines the partitioning created by the functional partitioner 206 based on structural partitioning constraints 214 resulting from the chip-level optimization process 213. The structural partitioner 215 creates new block-level constraints 216, 217 for datapath partitions 207 and non-datapath partitions 208 to improve timing and floorplan packing density. New block constraints 216, 217 trigger the re-estimation of feasible physical implementations by the DP builder 209 and non-DP structure estimator 211.

As noted above, the chip optimizer 213 may invoke the structural partitioner 215 multiple times in the chip optimization process improve chip floorplanning packing density using steps 205, 217.

For timing closure, the structural partitioner 215 analyzes failing timing paths based on the wire-load and timing information 214. If these paths "snake" through different partitions, the structural partitioner 215 is used to move the LBBs in the "snaking-path" between partitions to achieve timing convergence. An example is a failing timing path that traverses from a DP block to its associated control (DPC) in the Datapath Macro. In this case the structural partitioner 215 can analyze this path and bring the LBBs in the path in the control (source) partition to the datapath (destination) partition and utilize the empty spaces in the datapath for their placement. Conversely paths that are not timing critical can be made longer by the structural partitioner 215 if it reduces the path delay of other timing critical paths.

LBBs moved from the source partition take on the same physical implementation style as the destination partition. If all LBBs in the source partition are moved then the source partition is in effect merged with the destination partition. Therefore, shifting LBBs between DP partitions 207 and Non-DP partitions 208 has the effect of changing the physical implementation style of the affected LBBs from datapath style to random logic style or vice versa.

9. Final Chip Optimization

Final chip optimization is the $2^{nd}$ pass through the chip optimizer 213 with new block estimation models 210, 212 based on the refined constraints 216, 217 from the structural partitioner 215, in addition to chip constraints 222. The initial floorplan is refined for timing and density. Structural partitioner constraints 214 are converted to data and control files 223, 224, 225, 226 (see below) suitable for driving back-end tools 227, 228, 229, 230, 231, and 232.

The data and control files 223, 224, 225, 226 constitute a rigorous set of instructions, not a questionable prediction, for implementing a known timing and area convergence solution because accurate placement-based wire-load data have been used throughout the optimization process and the implementation of individual blocks has been proven feasible. Multiple rapid internal iterations between chip-level and block-level optimization ensure that constraints for driving the back-end implementation are well-balanced and optimal. These block-level constraints represent instructions to meet area and performance goals in a single pass through the back-end process, and therefore serve as an effective interface between front-end and back-end implementation in a RTL hand-off design flow.

10. Interface to Back-end Tools

The system 200 of the present invention does not directly generate final physical implementation of the chip. It generates detailed implementation constraints for back-end physical implementation tools based on an optimal floorplan and placement-based wire load models at chip and block-level. The result of the final chip optimization is expressed in a set of data and control files 223, 224, 225, 226 used to drive the back-end tools. Back-end tools are not required to follow all detailed guidance produced by the system 200 provided that the final physical implementation meets area and timing requirements.

The follow information is sent to the back-end tools for detailed physical implementation:
  Datapath 224
    Block-level structural netlist
    LBB-level floorplan
    Routing path of global wires
    Aspect ratio and area constraints
    Pin assignment
    Output load
    Block input arrival time
    Block output timing constraints
    Internal timing constraints
    Placement-based wire-load for wires between LBBs
    Command scripts
  Non-DP Logic 223
    Block-level structural netlist
    LBB-level cluster floorplan
    Routing path of global wires
    Aspect ratio and area constraints
    Pin assignment
    Output load
    Block input arrival time
    Block output timing constraints
    Internal timing constraints
    Placement-based wire-load for wires between LBBs
    Command scripts
  Chip Floor Plan 226
    Chip-level structural netlist of physical partitions
    Chip-level floorplan of physical partitions
    Routing path of global wires
    Aspect ratio and area constraints
    Pin assignment
    Output load
    Chip input arrival time
    Chip output timing constraints
    Internal timing constraints
    Placement-based wire-load for wires between physical partitions
    Command scripts
  Memory and hard macro 225
    Aspect ratio and area constraints
    Output load
    Block input arrival time
    Block output timing constraints
    Operating frequency
    Command scripts for calling memory generators or instantiating hard macro 11. User-controlled Automation The overall strategy in the RTL optimization process is to meet chip-level timing constraints with minimum area in a single pass through the design flow. Since the design flow is completely performance driven, altering the high level constraints (area, timing, power) will result in vastly different chip implementation.

The above design flow represents a built-in pre-programmed sequence designed to reach timing convergence in a single pass automatically for a majority of IC designs. The system 200 provides facilities for manual interventions to refine the automatic result. The built-in optimization sequence can also be modified by the user to adapt the system 200 to unique chip requirements.

11.1 Manual Refinement

When a user selects a module in the logical hierarchy tree, the RTL optimization system 200 automatically flattens the selected module for partitioning. If the user selects the top module, the whole chip will be flattened and the physical hierarchy for the entire chip will be created automatically. The user can therefore control the creation of the physical hierarchy by selecting manually modules in the logical hierarchy to be implemented hierarchically.

Manual entry points are inserted into an otherwise automated process for users to refine the automatically generated result and to:
  Control the mapping of logic into LBB library element.
  Control the partitioning interactively or by embedding directives in the RTL model. User intervention for partitioning includes:
  Moving LBB between partitions.
  Splitting and merging blocks.
  Changing block structure (e.g., change DP to random logic).
  Making an instance unique.
  Grouping and clustering.
  Hierarchy flattening.
  Control the creation and selection of block level implementation.
  Change pin assignment.
  Change block-level floorplans.
  Change chip-level floorplan.
  Use in-place-optimization for local refinement with minimum disturbance to unaffected logic.
  Fine tune chip optimization by back-annotating blocks with macro models 218 derived from actual block level implementation.

11.2 User-programmable Sequence

All software modules of the system 200 used in the built-in sequence and an underlying design database storing the RTL models and generated models and data are available to users through a procedural interface. A user may customize the design flow sequence using a programming language and the procedural interface.

12. Design Visualization

Design visualization is key to maintaining links between all transformations performed by the system 200 on the original RTL model hierarchy. The user interface is designed to support the use of the original user-defined RTL model as a functional interface to the analysis of the electronic design throughout the RTL design process.

A user can open one or more of the following windows to examine various views of the design. Cross-probing between all windows allows a user to select an object in any window and the same object, represented in different views in other windows, will be highlighted. FIG. 14 shows the following display windows:
  1. Logical hierarchy window 1401—reflects the original RTL model instance hierarchy tree.
  2. Physical hierarchy window 1402—reflects the physical hierarchy tree after partitioning.
  3. RTL model source window 1403—displays the content (HDL statements) of selected RTL model files.
  4. Block diagram window 1404—displays the LBB network of selected logical or physical partitions graphically as schematics.
  5. Floorplan window 1405—displays the physical floorplan and wiring of selected physical partitions.
  6. Net window 1406—displays all signal and instance names in the design for searching.
  7. Timing analysis window 1407—displays timing delay on logic paths.

Block diagram window 1404 represents the LBB network that is extracted from the RTL model 201. Conventional design tools today enable the user to begin with graphical inputs and develop a RTL model therefrom, or to view gate-level schematics after logic synthesis. In contrast, the RTL optimization system 200 of the present invention provides the ability to begin with an RTL model and extract a higher level model in the form of the LBB network, which is then visualized in block diagram window 1404. This enables the viewer to visualize and manipulate the electronic design at a higher level than gate-level schematics. Thus, this window represents visually the automatically partitioned electronic design, and enables the system designer to manually interact with the design, including changing partitioning, pin assignments, and the like as described above.

12.1 Special Partition Visualization Modes

1. Select modules in the logical hierarchy and display schematics at block, LBB, or mixed level. In the LBB schematic mode, each LBB is color coded to indicate the physical partition it belongs to.
2. Select modules in the physical hierarchy and display schematics at block, LBB, or mixed level. In the LBB schematic mode, each LBB is color coded to indicate which logical block it belongs to.
3. In the RTL source window, use different background color to highlight the RTL statements corresponding to various physical partitions.

I claim:

1. A method for predicting the physical characteristics of an electronic design before gate-level implementation, the method comprising:
   optimizing a network of technology-independent logic building blocks logically and physically using actual measurements taken from placed-and-routed physical implementations of logic structures to create a model of the electronic design; and
   passing optimized design information associated with the model to gate-level implementation tools to achieve predictable results at gate-level implementation of the electronic design.

2. The method of claim 1, wherein each logic building block represents a logic structure of a fabricated electronic design and has performance data derived from placement based information for a plurality of different physical implementations of the logic structure.

3. The method of claim 1, wherein performance data of at least one logic building block is stored in a library.

4. The method of claim 1, wherein performance data of at least one logic building block is generated on-the-fly at run time.

5. The method of claim 1, wherein optimizing the network of logic building blocks includes concurrent synthesis and placement of the logic building blocks.

6. The method of claim 1, wherein optimizing the network of logic building blocks includes floorplanning.

7. The method of claim 1, wherein optimizing the network of logic building blocks includes routing estimation.

8. The method of claim 1, wherein optimizing the network of logic building blocks includes partitioning into at least one group.

9. The method of claim 1, wherein optimizing the network of logic building blocks includes pin assignment.

10. The method of claim 1, wherein a design hand-off using the optimized design information enables the electronic design to be implemented to meet design requirements in a single pass through a gate-level physical implementation process.

11. The method of claim 1, further comprising:
    receiving a description of the electronic design; and
    synthesizing a description of the electronic design into the network of logic building blocks that are optimized, wherein the synthesizing preserves bus structures of the electronic design.

12. A method for designing an electronic design, the method comprising:
    creating a virtual prototype using actual measurements taken from placed-and-routed physical implementations of logic structures to model the electronic design thereby enabling design optimization before detailed physical implementation; and
    deriving a solution for design convergence based on data resulting from the design optimization.

13. The method of claim 12, wherein creating a virtual prototype further comprises:
    concurrently optimizing logical and physical implementations of the electronic design using actual measurements taken from placed-and-routed physical implementations of logic structures.

14. A method for abstracting a model of an electronic design into an efficient network for optimization, the method comprising:
    mapping the model into logic building blocks thereby creating a network of logic building blocks, a number of the logic building blocks having a logic structure including a plurality of gates thereby providing a higher level of abstraction than gates; and
    optimizing the network of logic building blocks, each logic building block having performance data based on actual measurements taken from placed and routed implementations of that logic building block.

15. The method of claim 14, wherein mapping the model into logic building blocks preserves bus structures of the electronic design.

16. The method of claim 14, wherein each logic building block represents a logic structure of a fabricated electronic design, and has performance data derived from placement based information for a plurality of different physical implementations of the logic structure.

17. The method of claim 14, wherein performance data of at least one logic building block is stored in a library.

18. The method of claim 14, wherein performance data of at least one logic building block is generated on-the-fly at run time.

19. The method of claim 14, wherein optimizing the network of logic building blocks includes concurrent synthesis and placement of the logic building blocks.

20. The method of claim 14, wherein optimizing the network of logic building blocks includes floorplanning.

21. The method of claim 14, wherein optimizing the network of logic building blocks includes routing estimation.

22. The method of claim 14, wherein optimizing the network of logic building blocks includes partitioning into at least one group.

23. The method of claim 14, wherein optimizing the network of logic building blocks includes pin assignment.

24. The method of claim 14, wherein optimizing the network of logic building blocks includes separation of data path and control logic.

25. The method of claim 14, wherein the optimized design data includes floorplan information.

26. The method of claim 14, wherein optimizing the network of logic building blocks produces optimized design data that includes one or more of timing information, routing information, placement information, netlist information, placement based wire load information, and pin assignment information.

27. The method of claim 14, wherein optimizing the network of logic building blocks produces optimized design data that enables the electronic design to be implemented to meet the design requirements in a single pass through a gate-level implementation process.

28. The method of claim 14, wherein the model is a Register-Transfer-Level description.

29. The method of claim 14, further comprising:
clustering multiple logical building blocks into partitions thereby yielding a partition level abstraction of the electronic design;
creating a model for each partition; and
optimizing additional levels of the electronic design using the partition models thereby enabling hierarchical optimization without reanalyzing partition level details.

30. A method for characterizing logic building blocks, the method comprising:
placing and routing physical implementations of a logic building block, the logic building block having a logic structure including a plurality of gates thereby providing a higher level of abstraction than gates; and
monitoring area and performance data of each placed-and-routed physical implementation based on a number of selected input parameter sets.

31. The method of claim 30, further comprising:
for each selected input parameter set, storing the resulting area and performance data thereby defining a performance envelope of the logic building block.

32. The method of claim 30, further comprising:
storing the logic building block in a library, the library capable of supplying a network of logic building blocks for representing the electronic design.

33. An electronic design computer program product encoded on one or more computer readable mediums, the product comprising:
a library of logic structures, each logic structure having performance data based on actual measurements of placed and routed implementations of that logic structure, the performance data being organized according to characteristics of the implementations; and
a plurality of modules for optimizing a network of a number of the logic structures using the actual measurements of placed and routed implementations to create an accurate model of the electronic design thereby enabling optimized design information associated with the accurate model to be passed to gate-level implementation tools to achieve predictable results at gate-level implementation of the electronic design.

34. The computer program product of claim 33, wherein the performance data for each implementation quantifies a relationship between a timing delay and an output load of the implementation.

35. The computer program product of claim 33, wherein the performance data includes performance data variations for combinations of topology, implementation type, bit width, output driver size, and output load.

* * * * *